(12) United States Patent
Kitamura et al.

(10) Patent No.: US 7,042,123 B2
(45) Date of Patent: May 9, 2006

(54) BICYCLE ELECTRICAL GENERATOR HUB

(75) Inventors: Satoshi Kitamura, Kitakatsuragigun (JP); Koken Ueno, Sakai (JP); Kazuhiro Takeda, Sakai (JP); Masahiko Fukuda, Amagasaki (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/114,065

(22) Filed: Apr. 26, 2005

(65) Prior Publication Data
US 2005/0285461 A1 Dec. 29, 2005

(30) Foreign Application Priority Data
Jun. 29, 2004 (JP) ............... 2004-191685

(51) Int. Cl.
- B62J 6/08 (2006.01)
- H02K 7/10 (2006.01)
- B62M 1/02 (2006.01)

(52) U.S. Cl. ............... 310/75 C; 310/68 R; 280/260
(58) Field of Classification Search ............... 310/75 C, 310/49 A, 68 R, 68 D
See application file for complete search history.

(56) References Cited

U.S. PATENT DOCUMENTS

| | | | | |
|---|---|---|---|---|
| 3,831,047 A * | 8/1974 | Sokol et al. | ............... | 310/68 R |
| 3,924,147 A * | 12/1975 | Tarnow et al. | ............... | 310/68 R |
| 4,761,577 A * | 8/1988 | Thomas et al. | ............... | 310/67 A |
| 5,681,234 A * | 10/1997 | Ethington | ............... | 474/70 |
| 5,770,902 A * | 6/1998 | Batten et al. | ............... | 310/71 |
| 6,015,159 A * | 1/2000 | Matsuo | ............... | 280/238 |
| 6,047,230 A * | 4/2000 | Spencer et al. | ............... | 701/57 |
| 6,118,196 A * | 9/2000 | Cheng-Yon | ............... | 310/75 C |
| 6,146,297 A * | 11/2000 | Kimura | ............... | 474/78 |
| 6,453,262 B1 * | 9/2002 | Kitamura | ............... | 702/145 |
| 2003/0001357 A1 | 1/2003 | Fujii et al. | | |
| 2004/0007938 A1 * | 1/2004 | Endo | ............... | 310/263 |
| 2004/0079612 A1 * | 4/2004 | Endo et al. | ............... | 192/217 |
| 2004/0092347 A1 | 5/2004 | Fukuda | | |
| 2005/0043129 A1 * | 2/2005 | Guderzo | ............... | 474/78 |

FOREIGN PATENT DOCUMENTS

| | | |
|---|---|---|
| DE | 196 32 391 | 2/1998 |
| EP | 1 216 912 A2 | 6/2002 |
| EP | 1 361 146 A1 | 11/2003 |
| EP | 1 381 021 A2 | 1/2004 |
| EP | 1391375 A1 | 2/2004 |
| EP | 1 394 030 A1 | 3/2004 |
| GB | 2 314 213 A | 12/1997 |
| JP | 07-229909 | 8/1995 |
| JP | 08175460 A * | 7/1996 |

(Continued)

*Primary Examiner*—Darren Schuberg
*Assistant Examiner*—Erik Preston
(74) *Attorney, Agent, or Firm*—Shiniyu Global IP Counselors

(57) ABSTRACT

A bicycle gearshift system is mounted on the rear part of the frame of the bicycle. The bicycle gearshift system includes an electrically powered rear derailleur, a rear hub, a charger part, and a gearshift control part. The electrically powered rear derailleur is mounted on the rear part of the frame. The rear hub is also mounted to the rear part of the frame. The rear hub has an electrical generator mechanism that generates electricity through the rotation of the wheel. The charger part is mounted on the rear hub and stores the electrical energy that was generated by the generator part. The gearshift control part is equipped on the electrically powered rear derailleur, where gearshift control of the electrically powered rear derailleur is performed through the energy that is stored in the charger part.

9 Claims, 16 Drawing Sheets

FOREIGN PATENT DOCUMENTS

| | | |
|---|---|---|
| JP | 2000-062523 | 2/2000 |
| JP | 2001-088759 | 4/2001 |
| JP | 2003-11879 A | 1/2003 |
| JP | 2003-130886 | 5/2003 |

* cited by examiner

BICYCLE ELECTRICAL GENERATOR HUB

CROSS-REFERENCE TO RELATED APPLICATIONS

This application claims priority to Japanese Patent Application No. 2004-191685. The entire disclosure of Japanese Patent Application No. 2004-191685 is hereby incorporated herein by reference.

BACKGROUND OF THE INVENTION

1. Field of the Invention

The present invention generally relates to a bicycle electrical generator hub mounted in the center part of a wheel of a bicycle. More specifically, the present invention relates to a bicycle gearshift system that is driven electrically and equipped on the rear hub part of a bicycle frame.

2. Background Information

Some bicycles are equipped with gearshift mechanisms such as derailleurs or hubs with internal gearshifters. Electrically powered gearshift devices are already known. In conventional gearshift systems that include electrically powered gearshift mechanisms, automatic gearshift control, for example, is performed by the electrically driven gearshift mechanism according to the speed of the bicycle, or gearshift control is performed through the operation of a gearshift operating part. See, for example, Japanese Patent Laid-Open No. 2003-011879.

Specifically, a gearshift operating part is equipped on the bicycle, a gearshift control part is mounted on the frame, and an electrical generator hub is used as a power supply. Gearshift systems equipped with motor units that electrically drive the gearshift mechanisms have been disclosed as conventional technologies. For example, gearshift systems where the motor units and the gearshift mechanisms are connected by gearshift cables, and gearshift systems where the electrically powered gearshift mechanisms are connected with control devices over electrical cables have been provided.

In a conventional gearshift system, not only are the gearshift operating part and the gearshift control part connected by a wire, but also the gearshift control part and the electrically powered gearshift mechanism or motor unit are connected by a wire as well. In addition, when shifting gears automatically according to the bicycle speed, bicycle speed signals have been obtained from signals from a dynamo equipped within a hub in the aforementioned conventional gearshift systems. However, when a normal battery, or the like, is used as the power supply, it has been necessary to connect also the speed sensor and the gearshift control device with a wire as well.

In view of the above, it will be apparent to those skilled in the art from this disclosure that there exists a need for an improved bicycle electrical generator hub mounted in the center part of a wheel of a bicycle, a bicycle gearshift system equipped on the rear part of a bicycle frame, a bicycle derailleur that is driven electrically and mounted on a bicycle frame, and a bicycle with such parts. This invention addresses this need in the art as well as other needs, which will become apparent to those skilled in the art from this disclosure.

SUMMARY OF THE INVENTION

One object of the present invention is to provide a bicycle, a bicycle gearshift system, and a bicycle derailleur that are able to reduce the manufacturing costs of bicycles while not damaging the visual appeal of the bicycles.

Another object of the present invention is to provide a bicycle electrical generator hub wherein the electric power that is generated is stable and useable regardless of the status of travel of the bicycle.

The foregoing objects can basically be attained by providing a bicycle electrical generator hub mounted in the center part of a wheel of a bicycle, a bicycle gearshift system equipped on the rear part of a bicycle frame, a bicycle derailleur that is driven electrically and mounted on a bicycle frame, and a bicycle with such parts, as explained below.

In the aforementioned conventional gearshift systems, after the gearshift operating parts, the gearshift control devices, and the gearshift mechanisms have each been fastened individually to the bicycle frame, it is then necessary to perform electrical wiring operations or gearshift cable wiring operations to each. Because of this, in addition to the normal bicycle assembly operations, it is necessary to perform installations operation for the gearshift system devices, and perform wiring operations, greatly increasing the number of manufacturing operations for the bicycle, leading to large increases in manufacturing costs. Moreover, the installation of the gearshift systems greatly changes the visual appearance of the bicycles, reducing their visual appeal.

On the other hand, in the aforementioned conventional gearshift systems, a dynamo equipped within the hub is used as the power supply. However, because the electric power of the dynamo is not produced when the wheel is not turning, the supply of electric power in this form is not stable, making it impossible [for the dynamo equipped within the hub] to be used as a power supply for bicycle electric equipment, such as gearshift control devices.

A bicycle electrical generator hub in accordance with a first aspect of the present invention is provided that is mounted at the center part of a wheel of a bicycle. The electrical generator hub includes a hub axle, a hub unit that is disposed at the outer periphery of the hub axle, an axle bearing, an electrical generator part, a charger part, and an electric power output part. The axle bearing is that which supports the hub unit relative to the hub axle so that the hub unit can rotate freely. The electrical generator part is that which generates electricity from the rotation of the wheel. The charger part is that which stores the electric power that has been generated by the electrical generator part. The electric power output part is that which can output to the outside the electric power that has been stored in the charger part.

In this bicycle electrical generator hub, the electrical generator generates electric power when the wheel rotates, the electric power that is generated is stored in the charger part, and the electric power that is stored is outputted to the outside. Here the charger part is equipped in the hub, and because the power that is stored in the charger part can be outputted, electric power can be outputted to electric equipment even if the bicycle is stopped. Because of this, the electric power that is generated is stable and can be used regardless of the state of travel of the bicycle.

In a bicycle electrical generator hub in accordance with a second aspect of the present invention, the generator part generates an alternating-current electric power from the rotation of the wheel, and the charger part includes a rectifier circuit that converts into direct current the alternating current that is generated by the generator part, and includes an electric power storage element that stores the direct-current electric power that has been rectified. In this case, the alternating-current electric power is converted into direct current and stored in the electric power storage element, and the direct-current electric power is outputted to the outside from the electric power output part. Because of this, the electrical generator hub can be used as it is as a power supply for electric equipment that normally operate using direct current, such as gearshift control devices, and the like.

In a bicycle electrical generator hub in accordance with a third aspect of the present invention, the charger part includes a washer-shaped circuit board that is mounted on or in the hub unit and through which the hub axle can pass, where the rectifier circuit and the electric power storage element are mounted on the circuit board. In this case, the circular space within the hub can be used for the disposition of the circuit board, making it possible to dispose the charger part within the hub in a compact manner.

In a bicycle electrical generator hub in accordance with a fourth aspect of the present invention, the electric power storage element is an electrical double layer capacitor. In this case, the use of an electrical double layer capacitor, which has a relatively large capacitance and excellent durability, as the electric power storage element not only makes it possible to drive a drive unit, such as a motor that uses large amounts of power, but also reduces the breakdown of the electric power storage element with repetitive charge/discharge cycling.

In a bicycle electrical generator hub in accordance with a fifth aspect of the present invention, the electrical generator hub further includes a speed signal generator part that generates a signal for detecting speed from the electric power that is generated by the electrical generator part. In this case, the generation of the signal for speed detection from the electric power, wherein the frequency of the electric power varies depending on the speed, makes it possible to detect the speed of travel of the bicycle without using a sensor for speed detection. As a result, this signal can be used in, for example, automatic gearshift control of the gearshift mechanism, control of the suspension, or the like, without using a separate speed sensor, and can be used in, for example, displaying the speed or displaying the distance traveled of the bicycle.

In a bicycle electrical generator hub in accordance with a sixth aspect of the present invention, the electrical generator hub further includes a signal superimposition part that superimposes the signal for speed detection, generated by the speed signal generator part, on the electric power that is stored in the electric power storage element. In this case, it is possible to output the electric power and the signal for speed detection using a single output wire, not only reducing the number of interconnection wires, but also reducing the time required for the wiring operations.

In a bicycle electrical generator hub in accordance with a seventh aspect of the present invention, the electrical generator part has a permanent magnet equipped on the inner peripheral surface of the hub unit and an inner stationary unit that is disposed on the inner peripheral side of the permanent magnet and that is affixed to the hub axle. In this case, the fact that the electrical generator part can be housed within the hub makes the electrical generator hub more compact than a structure wherein the electrical generator part is disposed on the outside of the hub unit.

In a bicycle electrical generator hub in accordance with an eighth aspect of the present invention, the inner stationary unit includes a ring-shaped coil that is disposed on the inner peripheral side of the permanent magnet and a yoke that is disposed so as to encompass the periphery of the coil and that includes multiple sets of first layered yokes that each comprise multiple flat layer pieces disposed on one side of the axial direction of the coil and multiple sets of second layered yokes that each comprise flat layer pieces equipped on the other side of the axial direction of the coil, where each of the multiple flat layer pieces includes yoke outer periphery parts that are disposed between the permanent magnet and the coil and that extend in the opposite direction from the one side of the axial direction or the other side of the axial direction, and yoke internal periphery parts that are magnetically linked to the yoke external periphery parts and that are disposed on the one side of the axial direction of the coil inner periphery or the other side of the axial direction of the coil inner periphery, where the multiple sets of first and second layered yokes are disposed in an alternating manner with each yoke inner periphery part facing in the direction of the axle and each yoke outer periphery part facing the direction of the periphery.

In this case, the permanent magnet and the yoke outer periphery part face each other, and by the rotation of the two relative to each other, alternating magnetic flux is generated in the yoke inner periphery part. This generates an electric current in the coil, generating electricity. Specifically, the alternating magnetic flux is generated by alternating the situations wherein the yoke outer periphery part of the first layered yoke is an N pole and the yoke outer periphery part of the second layered yoke is an S pole with the situation wherein the yoke outer periphery part of the first layered yoke is an S pole and the yoke outer periphery part of the second layered yoke is an N pole. Because this alternating flux changes, eddy currents are produced when generating electricity.

These eddy currents reduce the efficiency of electricity generation. However, in the electrical generator part of the present invention, the yoke is made of multiple flat layer parts, making it possible to reduce the eddy currents. In other words, it is known that, in this type of electrical generator device, the occurrence of the eddy current falls proportionately to the inverse square of the yoke thickness (plate thickness), making it possible to reduce the occurrence of eddy currents by making this thickness thinner through structuring the yoke from flat layer pieces. Furthermore, here the round periphery part of the yoke is disposed facing in the direction of the axis, and thus the first layered yoke and second layered yoke are connected directly magnetically by the inner periphery parts of each yoke, making other magnetic materials for connecting the two layered yokes unnecessary. Finally, it is possible to produce an adequate magnetic circuit cross-sectional area through which the magnetic flux will pass between the two layered yokes, making it possible to avoid magnetic saturation. Consequently, it is possible to reduce greatly losses such as magnetic resistance, improving the efficiency of the output, making it possible to reduce the no-load rotational torque.

In a bicycle electrical generator hub in accordance with a ninth aspect of the present invention, the bicycle electrical generator hub further include a free wheel that can transmit to the hub unit only the rotation in the forward direction of travel of the bicycle. In this case, the free wheel to which a sprocket can be attached, is installed, making it possible to achieve a rear hub with an electrical generator function. Because of this, it is possible to supply electric power efficiently, to the electrical devices, such as gearshift devices and other control devices aside from the headlamp that are often disposed closer to the rear wheel than to the front wheel. Furthermore, because the number of cables requiring wiring from the rear hub is small, it is easy to wire the electrical devices by running the wires from the rear hub to the electrical devices.

A bicycle gearshift system in accordance with a tenth aspect of the present invention is mounted on an electrically powered derailleur part of a bicycle frame. The gearshift system includes an electrically powered gearshift mechanism, a rear hub, a charger part, and a gearshift control part. The electrically powered gearshift mechanism is a gearshift mechanism that is mounted on the electrically powered derailleur part of the frame and that is driven electrically. The rear hub has an electrical generator part that generates electricity from the rotation of the wheel, and is mounted on the rear part of the frame. The charger part is equipped in or on either the rear hub or the electrically powered gearshift mechanism, and stores the electric power generated by the electrical generator part. The gearshift control part is equipped in or on either the rear hub or the electrically powered gearshift mechanism, and performs gearshift control of the electrically powered gearshift mechanism by the electric power that is stored in the charger part.

In this gearshift system, when the bicycle is in motion, the electric power that is generated by the electrical generator within the rear hub that is mounted at the rear part of the frame is stored in the charger part, and the gear shifting of the electrically powered gearshift mechanism mounted at the rear part of the frame is controlled by the gearshift control part by this electric power. Here not only is the electrical generator part equipped in or on the rear hub, but the charger part and the gearshift control part are equipped in or on either the rear hub or the electrically powered gearshift mechanism. Thus, the rear hub and the electrically powered gearshift mechanism are mounted on the bicycle, and it is possible to operate the gearshift system by merely connecting these components with wires. Here no extraneous components aside from the rear hub and the electrically operated gearshift mechanism are mounted on the bicycle, and there is no need to change power supplies in order to operate the gearshift system, and thus, not only is it possible to reduce the amount of labor in the bicycle assembly process and in the wiring process, but also there will be no adverse affect to the visual appeal. Because of this, not only is it possible to limit the manufacturing costs of the bicycle, but also there is less damage to the visual appeal of the bicycle, even when this gearshift system is mounted on the bicycle.

In a bicycle gearshift system in accordance with an eleventh aspect of the present invention, the bicycle gearshift system further includes a speed signal generator part that generates signals for detecting the speed from the electric power that is generated by the electrical generator part, equipped in or on either the rear hub or the electrically powered gearshift mechanism. In this case, the generation of the signal for detecting the speed, from the electric power wherein the frequency changes depending on the speed, makes it possible to detect the speed of travel of the bicycle without the use of any separate sensor for detecting the speed. Because of this, the gear shifting of the electrically powered gearshift mechanism is controlled automatically without the provision of a separate speed sensor.

In a bicycle gearshift system in accordance with a twelfth aspect of the present invention, the speed signal generator part is equipped in or on the rear hub. In this case, the speed signal is generated within the rear hub, so it is easy to accomplish a bicycle gearshift system wherein gear shifting is performed automatically based on a speed signal.

In a bicycle gearshift system in accordance with a thirteenth aspect of the present invention, the electrically powered gearshift mechanism is an electrically powered rear derailleur, including a base member that is mounted on the frame, a moveable member that moves relative to the base member, a link mechanism that moveably links the base member and the moveable member, a chain guide that is mounted swivelably to the moveable member and that includes a guide pulley mounted at the base end thereof and a tension pulley that is mounted on the distal end thereof, and an electrical drive part that drives the link mechanism. In this case, the rear derailleur has extra space within the rear hub when compared to an internally mounted gearshift hub, and thus it is easy to equip a portion of the system structure, such as the charger part, within the rear hub.

In a bicycle gearshift system in accordance with a fourteenth aspect of the present invention, the bicycle gearshift system further includes a rotation sensor that detects the rotation of either the guide pulley or the tension pulley. In this case, the two pulleys rotate in linked motion with the rotation of the crank of the bicycle (due to the chain), and thus, it is possible to detect the rotation of the crank using the rotation sensor. Because of this, it is possible to control with certainty the shifting of the gear shifting of the derailleur, where the gear shifting cannot be performed when the crank is not rotating and the chain is not moving.

In a bicycle gearshift system in accordance with a fifteenth aspect of the present invention, the gearshift control part is equipped in or on the electrically powered gearshift mechanism. In this case, the gearshift control part is equipped in or on the mechanism to be controlled, making it possible to eliminate the wiring, and also making it possible to reduce the manufacturing costs.

In a bicycle gearshift system in accordance with a sixteenth aspect of the present invention, the charger part is equipped in or on the rear hub. In this case, it is possible to locate the charger part and the electrical generator part, which generates the electric power, in relatively close proximity to each other, making it possible to reduce losses of electric power, and making it possible to store the electric power efficiently.

In a bicycle gearshift system in accordance with a seventeenth aspect of the present invention, the gearshift control part controls the gear shifting of the electrically powered gearshift mechanism automatically based on the speed detection signal that is generated by the speed signal generator part. In this case it is possible to reduce the cost of the automatic gearshift control that is performed by shifting up and shifting down according to the speed, without replacing the electric power supply.

A bicycle derailleur in accordance with an eighteenth aspect of the present invention is provided that is an electrically driven derailleur that is mounted on the frame of a bicycle. The bicycle derailleur includes a base member, a moveable member, a link mechanism, a chain guide and electrically powered drive part, and a gearshift control part. The base member is a member that is mounted on the frame. The moveable member is a member that moves relative to the base member. The link mechanism is a mechanism that links the base member and the moveable member in a moveable manner. The chain guide is pivotally mounted (swivelably) to the moveable member. The electrically powered drive part is that which drives the link mechanism. The gearshift control part is that which performs gearshift control of the electrically powered drive part.

In this derailleur a gearshift control part is provided in addition to an electrically powered drive part, and thus there is no need to provide a gearshift control part or an electrically powered drive part separately, making it possible to control the derailleur simply by connecting the power supply and the signal wire for the speed signal. Because of this, the visual appeal of the bicycle is no different from when a normal derailleur is mounted. Additionally, this eliminates the work in mounting the gearshift control part or gearshift drive part, and eliminates the work in wiring the same, making it possible to streamline the bicycle manufacturing process. As a result, it is possible to limit the bicycle manufacturing costs. Consequently, it is not only possible to limit the manufacturing costs of the bicycle, but also to reduce damage to the visual appeal of the bicycle, even when this derailleur is mounted on the bicycle.

In a bicycle derailleur in accordance with a nineteenth aspect of the present invention, the chain guide includes a plate member that is pivotally mounted (swivelably) to the moveable member, a guide pulley that is mounted rotatably to the base end of the plate member, and a tension pulley that is mounted rotatably to the distal end of the plate member, where the derailleur further includes a rotation sensor that detects the rotation of either the guide pulley or the tension pulley. In this case, the two pulleys rotate in linked motion with the rotation of the bicycle crank (due to the chain), making it possible to detect the rotation of the crank using the rotation sensor. Because of this, the gearshift control of the derailleur can be performed with certainty by performing the gearshift control when the rotation of the crank is detected, in a derailleur wherein the shifting of gears cannot be performed unless the crank is rotating and the chain is moving.

A bicycle in accordance with a twentieth aspect of the present invention is provided. The bicycle includes a frame, a front wheel, a rear wheel, an electrically powered gearshift mechanism, a charger part, and a gearshift control part. The frame includes a handlebar part and a front fork. The front wheel is rotatably mounted on the front fork. The rear wheel is rotatably mounted on the rear part of the frame, and has a rear hub and an electrical generator part equipped on or in the rear hub. An electrically powered derailleur is equipped at the rear part of the frame. The charger part is equipped on or in either the rear hub or the electrically powered gearshift mechanism, and stores the electric power that is generated by the electrical generator part. The gearshift control part is equipped in or on either the rear hub or the electrically powered rear derailleur, and controls the gear shifting of the electrically powered gearshift mechanism with the electric power that is stored in charger part.

In this bicycle, when the bicycle is in motion, the electric power that is generated by the electrical generator part within the rear hub that is mounted on the rear part of the frame, is stored in the charger part, and the shifting of gears in the electrically powered gearshift mechanism that is mounted on the rear part of the frame is controlled by the gearshift control part using this electric power. Because not only is the electrical generator part equipped in or on the rear hub, but also the charger part and the gearshift control part are equipped in or on either the rear hub or the electrically powered gearshift mechanism, it is possible to operate the gearshift system through merely mounting the rear hub and electrically powered gearshift mechanism on the bicycle and then connecting these components using wires. The result is that it is not only possible to reduce the amount of work in assembling the bicycle and reduce the amount of work in the wiring operations, but also possible to minimize the change in the visual appearance because the gearshift control system operates without the need for changing the electric power supply and without having to mount on the bicycle extraneous components for shifting gears other than the rear hub and the electrically powered gearshift mechanism.

With the bicycle electrical generator hub according to the present invention, the hub is equipped with a charger part, and the electric power that is stored in the charger part is outputted, thus making it possible to output electric power to electrical devices even when the bicycle is stopped. This makes it possible to stabilize and use the generated electric power regardless of the state of travel of the bicycle.

With a bicycle gearshift system in accordance with another aspect of the present invention, the gearshift system operates without requiring the replacement of the power supply and without requiring installation onto the bicycle of extraneous equipment other than the rear hub and the electrically powered gearshift mechanism, and thus, not only making it possible to reduce the amount of work in the bicycle assembly operations and in the wiring operations, but also reducing the change in the visual appearance of the bicycle. Because of this, it is not only possible to control the bicycle manufacturing costs, but also to prevent damage to the visual appearance of the bicycle, even when this gearshift system is mounted on the bicycle.

With a bicycle derailleur in accordance with yet another aspect of the present invention, a gearshift control part is equipped in addition to the electrically powered drive part, thus eliminating the need to provide the gearshift control part separate from the electrically powered drive part, making it possible to control the derailleur through simply connecting the power supply and the signal line for the speed signal. As a result, there is no difference in the visual appeal of the bicycle from the case where a normal derailleur is installed. Furthermore, the operations for mounting the gearshift control part or the gearshift drive part, and the operations for wiring the same, are eliminated, making it possible to streamline the bicycle manufacturing process. Because of this, it is possible to limit the bicycle manufacturing costs. As a result, even when this derailleur is mounted on the bicycle, it is not only possible to limit the bicycle manufacturing costs, but also there will be little damage to the visual appeal of the bicycle.

With a bicycle in accordance with yet another aspect of the present invention, not only is the rear hub equipped with an electrical generator part, but also the rear hub or the electrically powered gearshift mechanism is equipped with a charger part and a gearshift control part, so it is possible to operate the gearshift system by merely mounting the rear hub and the electrically powered gearshift mechanism onto the bicycle and connecting these components using wiring. The result is that the gearshift control system is operated without the need for changing the power supply or the need for mounting onto the bicycle any extraneous components other than the rear hub and the electrically powered gearshift mechanism for shifting the gears, and thus, not only making it possible to reduce the amount of work involved in the bicycle assembly operations and in the wiring operations, but also reducing the impact on the visual appearance of the bicycle. Because of this, even when the gearshift control system is mounted on the bicycle, it is still possible to limit the bicycle manufacturing costs, and to reduce the damage to the visual appeal of the bicycle.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
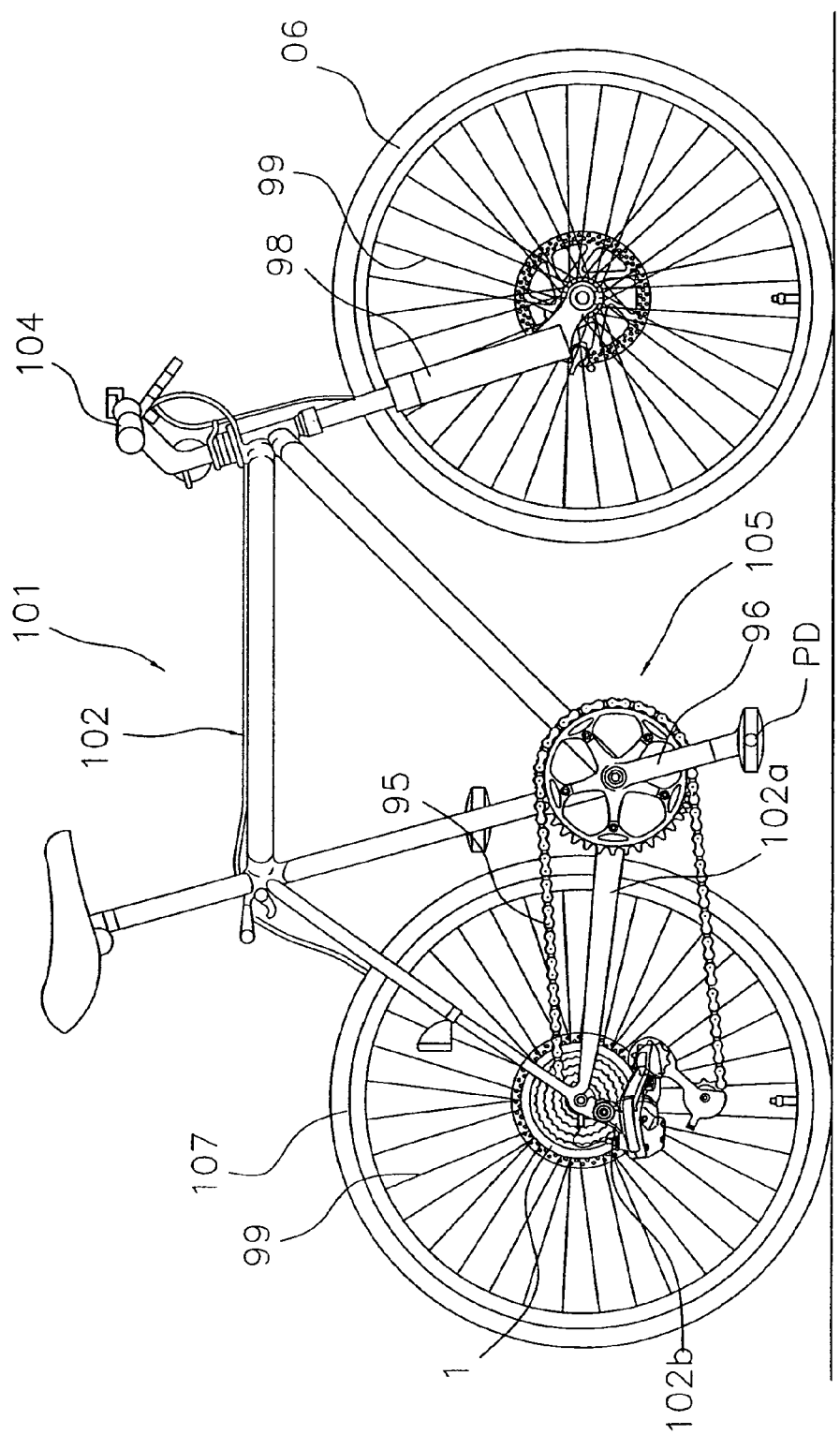
FIG. 1 is a side view of a bicycle equipped with an electrical generator hub, a bicycle gearshift system and a bicycle derailleur in accordance with an example embodiment of the present invention.

Referring initially to FIG. 1, a bicycle 101 is illustrated in accordance with a first embodiment of the present invention. The bicycle 101 is equipped with a diamond-shaped frame 102 with a suspension fork 98 pivotally coupled thereto. A handlebar 104 is rigidly attached to the suspension fork 98 to steer the bicycle 101. A drive train (part) 105 is attached to the frame. The drive train 105 includes a chain 95, a gear crank or crank set 96 onto which a pedal PD is mounted, a electrically powered rear derailleur (an example of an electrically powered gearshift mechanism) 97, as well as other parts as will be apparent to those skilled in the art from this disclosure. Front and rear wheels 106 and 107 are mounted on the suspension fork 98 and a rear part of the frame 102. Both of the front and rear wheels 106 and 107 have a plurality of spokes 99. The wheel 107 is equipped with a hub dynamo (an example of an electrical generator hub) 1 with spokes 99 extending outwardly therefrom to the rim of the wheel 107.

Structure of the Hub Dynamo

Figure 2:
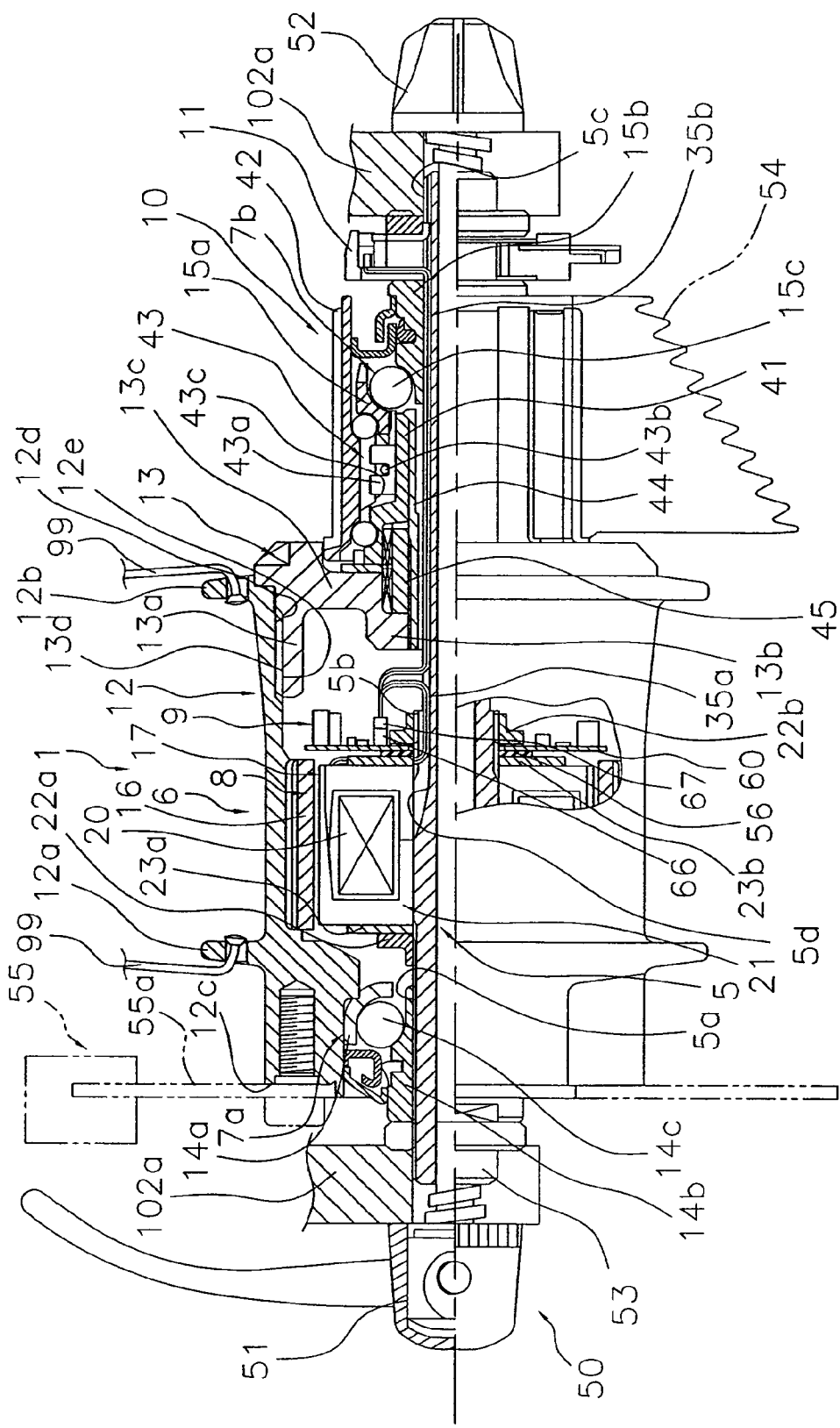
FIG. 2 is a partial cutaway cross-sectional view of the rear (gear) electrical generator hub according to an example embodiment of the present invention.

In FIG. 2, the hub dynamo 1 according to one example embodiment of the present invention is illustrated. The hub dynamo 1 is a rear hub dynamo equipped in or on the rear wheel 107 of the bicycle 101. The rear hub dynamo 1 is not only mounted in the rear wheel 107 of the bicycle 101 via the spokes 99, but also on the rear end of the chain stays 102*a* of the frame 102. This rear hub 1 includes a hub axle 5, a hub unit 6, a pair of hub (axle) bearings 107*a* and 107*b*, an electrical generator mechanism or part 8, a charger part 9, a freewheel 10 and an electric power output terminal (i.e. an electric energy output part) 11. The hub axle 5 is rigidly attached at both ends thereof to the rear end parts of the chain stays 102*a*. The hub unit 6 is disposed on the outer periphery (e.g. the outer peripheral side) of the hub axle 5. The hub bearings 7*a* and 7*b* are arranged to rotatably support the hub unit 6 relative to the hub axle 5. The electrical generator mechanism 8 is disposed between the hub unit 6 and the hub axle 5 and generates electricity from the motion (rotation) of the hub unit 6 relative to the hub axle 5. The charger part 9 stores the electricity (i.e. electrical energy or power) that is generated by the electrical generator mechanism 8. The freewheel 10 is arranged on the right-hand side of the hub unit 6, as shown in FIG. 2. The electric power output terminal (an example of an electric energy output part) 11 can output the electrical energy stored in the charger part 9 to the outside (i.e. externally of the hub 1).

The hub axle 5 is a tubular substantially cylindrical member constructed of a lightweight rigid material such as, for example, chromium molybdenum steel (i.e. chrome-moly). Both ends of the hub axle 5 are rigidly attached to the rear end part of the frame 102 (i.e. the chain stays 102*a*) by a quick release mechanism 50 for ease in attachment and removal. The quick release mechanism 50 is well-known, and includes a cam lever 51, a nut 52, and a linkage rod 53 that mates on opposite ends with the cam lever 51 and the nut 52. The linkage rod 53 of the quick release mechanism 50 passes through the hub axle 5. In other words, the hub axle 5 has a longitudinal interior passageway for receiving the linkage rod 53. The hub axle 5 has three male screw parts or sections 5*a*, 5*b* and 5*c* arranged sequentially (i.e. in series) from the left-hand side to the right-hand side, as viewed in FIG. 2. The three male screw parts 5*a*, 5*b* and 5*c* are formed in three locations on the outer periphery of the hub axle 5. The male screw part 5*a* is arranged to mount a ball bearing retainer (described below) of the hub bearing 7*a* to the hub axle 5, but also is arranged and configured to rigidly mount an inside stationary unit (described below) of the electrical generator mechanism 8 to the hub axle 5. The male screw part 5*b* is also arranged to rigidly attach the inside stationary unit (described below) to the hub axle 5. The male screw part 5*c* is arranged to mount a ball bearing retainer (described below) of the hub bearing 7*b* to the hub axle 5. The electric power output terminal 11 is non-rotatably mounted on the right-hand end of the hub axle 5. The hub axle 5 further includes a cord wiring groove 5*d* for passing connection cords 35*a* and 35*b* for the electric power output formed on the outer peripheral surface of the hub axle 5 on the right-hand end, as shown in FIG. 2. The cord wiring groove extends from the area where the electrical generator mechanism 8 is mounted to the area where the electric power output terminal 11 is mounted. The hub axle 5 further includes mutually parallel chamfered parts 5e (shown in FIG. 9) formed in the outer peripheral surface where the male screw part 5b is formed in the hub axle 5, with the cord wiring groove 5d interposed between the chamfered parts 5e. The connection cord 35a connects the electrical generator mechanism 8 to the charger part 9, and the connection cord 35b connects the charger part 9 to the electric power output terminal 11.

The hub unit 6 is a member constructed of a light weight rigid material such as, for example, aluminum alloy. The hub unit 6 includes a cylindrical case main unit 12 and a cover member 13. The case main unit 12 has an aperture 12d on the right-hand surface as viewed in FIG. 2 with the cover member 13 removably mounted on the case main unit 12 so as to cover the aperture 12d of the case main unit 12. The case main unit 12 has a pair of hub flanges 12a and 12b disposed on opposite ends of the main unit 12 with a gap interposed therebetween in the axial direction on the outer peripheral surface of the case main unit 12. The spokes 99 are connected to these hub flanges 12a and 12b. The aperture 12d of the case main unit 12 is sized and configured such that the electrical generator mechanism 8 can be received therein. The case main unit 12 further includes a female screw part 12e for mounting the cover member 13 formed in the aperture 12d. The case main unit 12 further includes a brake mounting part 12c configured and arranged to fixedly mount a disk brake rotor 55a of a disk brake 55 thereto via a plurality of fasteners. The brake mounting part 12c is arranged on the left-hand end part of the case main unit 12 as viewed in FIG. 2 (i.e. at an opposite end of the hub axle 5 from the freewheel 10).

The cover member 13 is a member that is preferably fabricated as a single unit. The cover member 13 includes an outer cylinder part 13a, an inner cylinder part 13b and a linkage part 13c. The outer cylinder part 13a has a male screw part 13d that mates with the female screw part 12e of the case main unit 12. The male screw part 13d is formed on the outer periphery of the outer cylinder part 13a. The inner cylinder part 13b is disposed on the inner peripheral side of the outer cylinder part 13a with a gap interposed therebetween. The linkage part 13c is arranged between the outer cylinder part 13a and the inner cylinder part 13b (i.e. the linkage part 13c links the two cylinder parts 13a and 13b). A connecting (linking) member or bolt 44 is mated to the inner peripheral surface of the inner cylinder part 13b to link the free wheel 10 to the hub unit 6, as explained below in more detail.

The hub bearing 7a includes a first ball bearing retainer 14a, a second ball bearing retainer 14b and a plurality of ball bearings 14c. The first ball bearing retainer 7a is disposed at the left-hand end on the inner peripheral surface of the case main unit 12. The second ball bearing retainer 14b is threadedly mounted on the male screw part 5a of the hub axle 5. The ball bearings 14c are arranged between the ball bearing retainer 14b and the ball bearing retainer 14a. The ball bearings 14c contact the ball bearing retainers 14a and 14b such that the ball bearings 14c rotate when the hub unit 6 rotates relative to the hub axle 5. The hub bearing 7b is disposed between the free wheel 10 and the hub axle 5 (i.e. at an opposite end of the hub axle 5 from the hub bearing 7a). The hub bearing 7b includes a first ball bearing retainer 15a, a second ball bearing retainer 15b and a plurality of ball bearings 15c. The first ball bearing retainer 15a is disposed at the free wheel 10. The second ball bearing retainer 15b is threadedly mounted on the male screw part 5c of the hub axle 5. The ball bearings 15c are arranged between the ball bearing retainer 15b and the ball bearing retainer 15a. The ball bearings 15c contact the ball bearing retainers 15a and 15b such that the ball bearings 14c rotate when the ball bearing retainers 15a and 15b rotate relative to each other. The spaces around the ball bearings 14c and 15c is filled (packed) with grease to reduce friction.

The electrical generator mechanism 8 includes a permanent magnet 16 and an internal stationary unit 17. The permanent magnet is rigidly fixed to the case main unit 12. The internal stationary unit 17 is rigidly fixed to the hub axle 5.

The permanent magnet 16 is rigidly fixed to the internal surface of the case main unit 12, as shown in FIG. 2. The permanent magnet 16 is structured from four magnet units that are partitioned at equal circumferential intervals around the case main unit 12. The four magnet units of this permanent magnet 16 are provided with north pole and south pole polarities that alternate at equal intervals about the permanent magnet 16, each opposing yoke outer peripheral parts of the internal stationary unit 17 described below.

The inside stationary unit 17 basically includes a ring-shaped coil 20 and a yoke 21 that is arranged so as to encompass the coil 20. Furthermore, the coil 20 and yoke 21 are rigidly attached to the hub axle 5 through their interposition between a pair of nuts 21a and 21b that mate with the male screw parts 5a and 5b that are formed on the outer periphery of the hub axle 5. The coil 20 and yoke 21 are positioned in an axial direction so as to radially face the permanent magnet 16.

Figure 3:
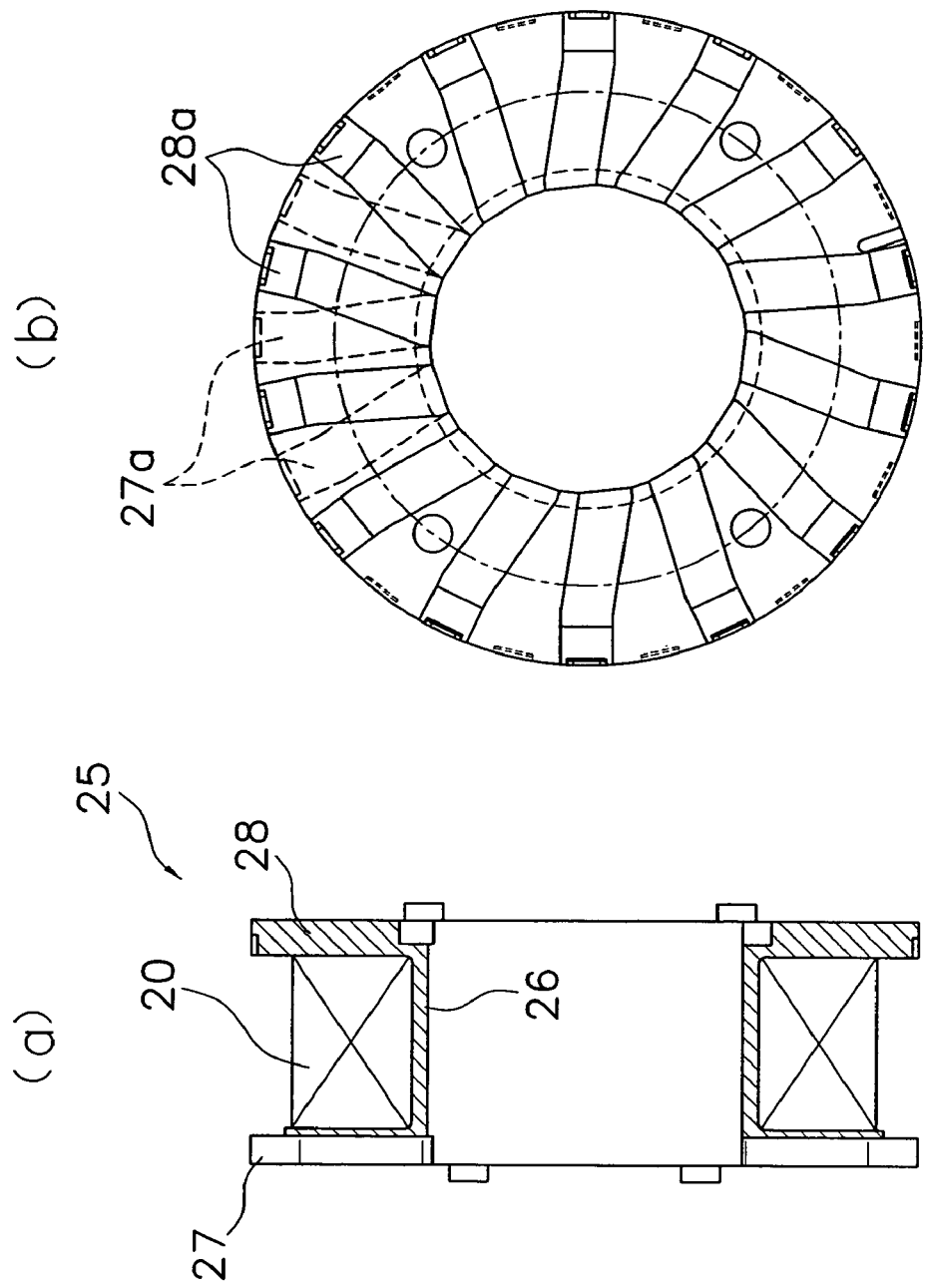
FIGS. 3(*a*) and 3(*b*) are transverse cross-sectional side and axial end elevational views of the bobbin/yoke of the rear hub illustrated in FIGS. 1 and 2.
Figure 4:
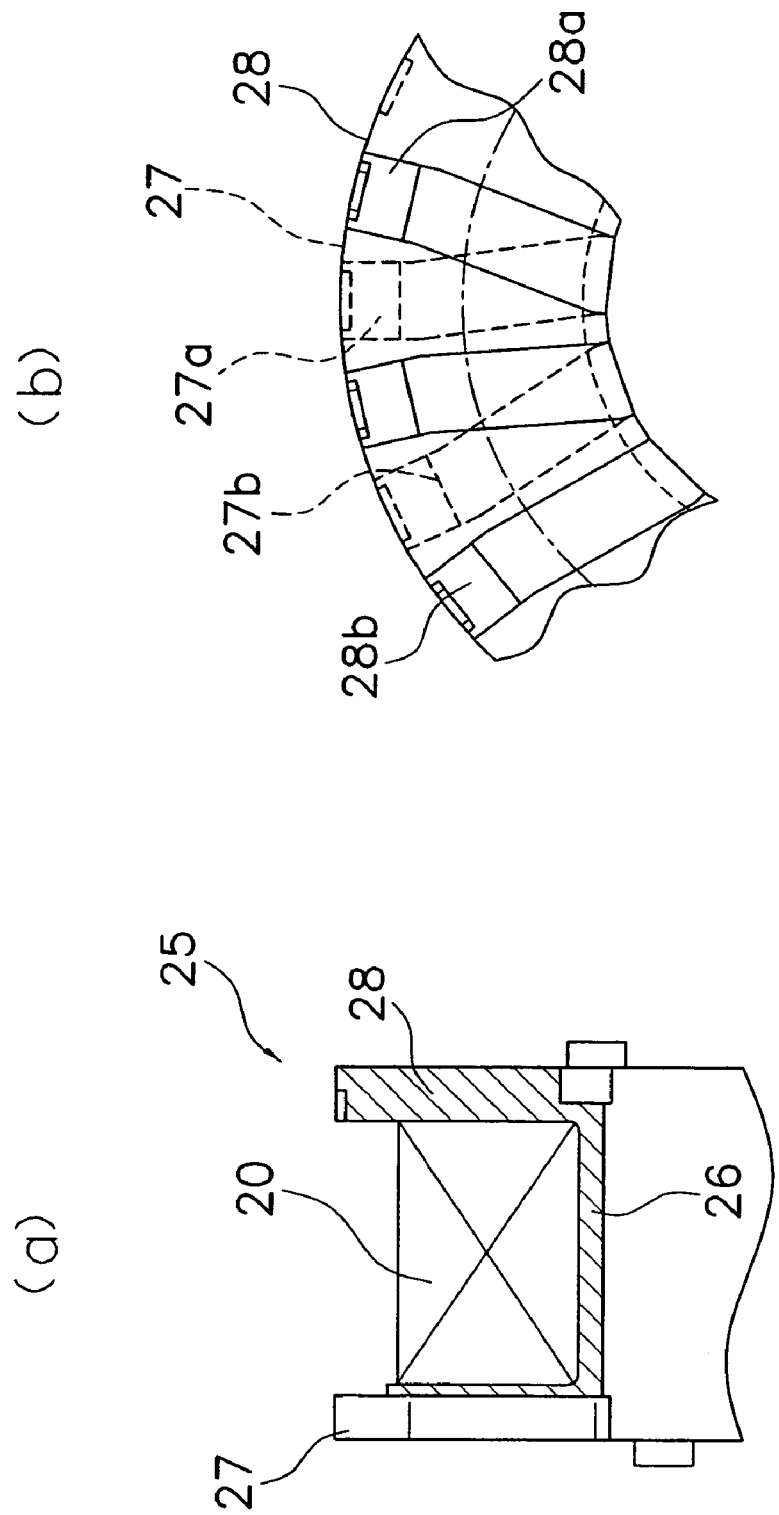
FIGS. 4(*a*) and 4(*b*) are enlarged, partial transverse cross-sectional side and axial end elevational views of the bobbin illustrated in FIGS. 3(*a*) and 3(*b*)
Figure 5:
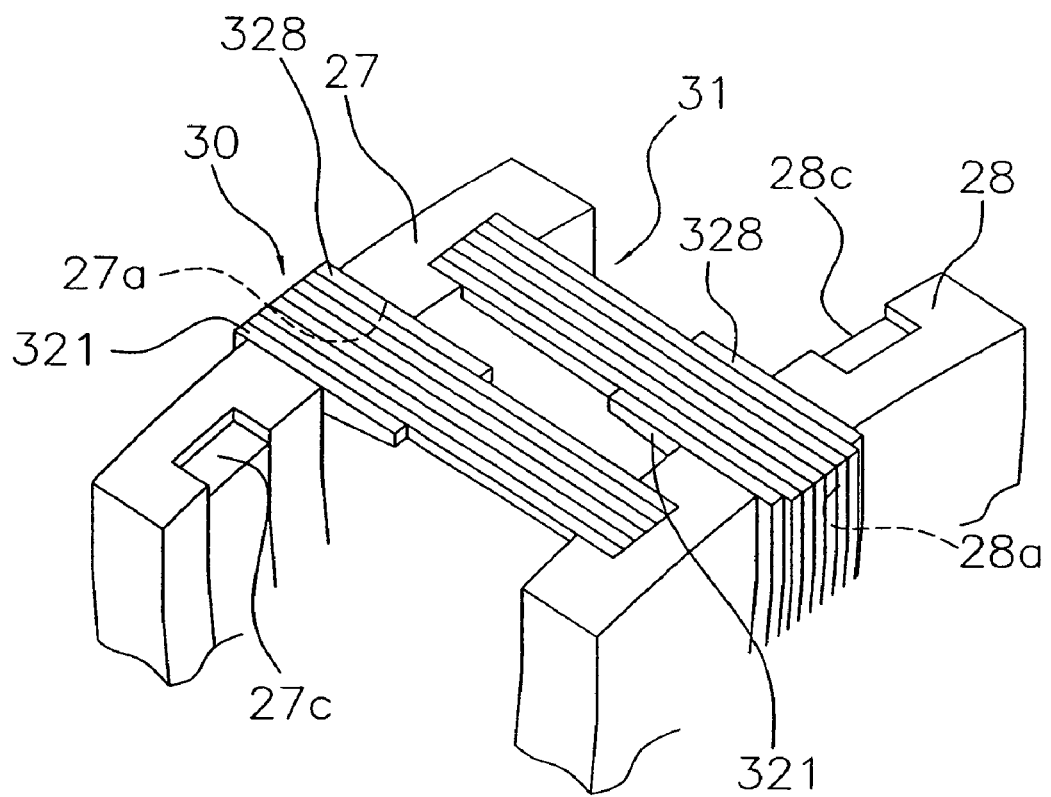
FIG. 5 is a further enlarged perspective (oblique) view of portions of the bobbin/yoke illustrated in FIGS. 4(*a*) and 4(*b*)

The coil 20, as shown in FIG. 3, is wound onto a bobbin 25. The bobbin 25 includes a cylindrical trunk part 26, a first flange 27 and a second flange 28, as shown in FIGS. 3 and 4. FIG. 4 is an enlarged, partial view of FIG. 3 (where both FIG. 3 and FIG. 4 show views where the yoke has been removed). The coil 20 is wound onto the outer periphery of the cylindrical trunk part 26. The first flange 27 and the second flange 28 extend radially outwardly from opposite axial end parts of the trunk part 26. In the first and second flanges 27 and 28, multiple grooves 27a and 28a are formed. The grooves 27a and 28a extend in essentially the radial direction, and are fabricated or formed in the side surfaces of the outer axial sides (ends) of the first and second flanges 27 and 28, respectively. These grooves 27a and 28a are fabricated so as to be offset (spaced) from each other on the outer peripheral surface, when viewed in the axial direction (i.e. as seen in FIGS. 3(b) and 4(b)). Only, three of the grooves 27a are illustrated in FIGS. 3 and 4. However, it will be apparent to those skilled in the art from this disclosure that grooves 27a are formed about the entire circumference of the first flange 27 in a pattern such as the partial patter illustrated in FIGS. 3(b) and 4(b). In other words, the first and second flanges 27 and 28 are constructed so that each groove 28a of the second flange 28 is positioned between two adjacent grooves 27a of the first flange 27 so that the grooves 27a and 28a are at least partially overlap in the essentially center part in the radial direction when viewed in the axial direction. Thus, on the inner peripheral side of the cylindrical trunk part 26, the appearance of the grooves 27a and 28a in the axial direction are essentially completely overlapping. Additionally, a portion of each of the grooves 27a and 28a on the outer peripheral side is notched or bent to become notch parts 27b and 28b. On the outer peripheral edge of each of the flanges 27 and 28 are fabricated multiple indentations 27c and 28c, which have specific lengths as measured from the outside to the inside in the axial direction, as shown in FIGS. 4 and 5. FIG. 5 is a partial, enlarged perspective view of FIG. 4. The multiple indentations 27c and 28c are formed in the circumferential areas between where the grooves 27a and 28a are formed (i.e. in the areas where the grooves 27a and 28a are not fabricated).

Figure 6:
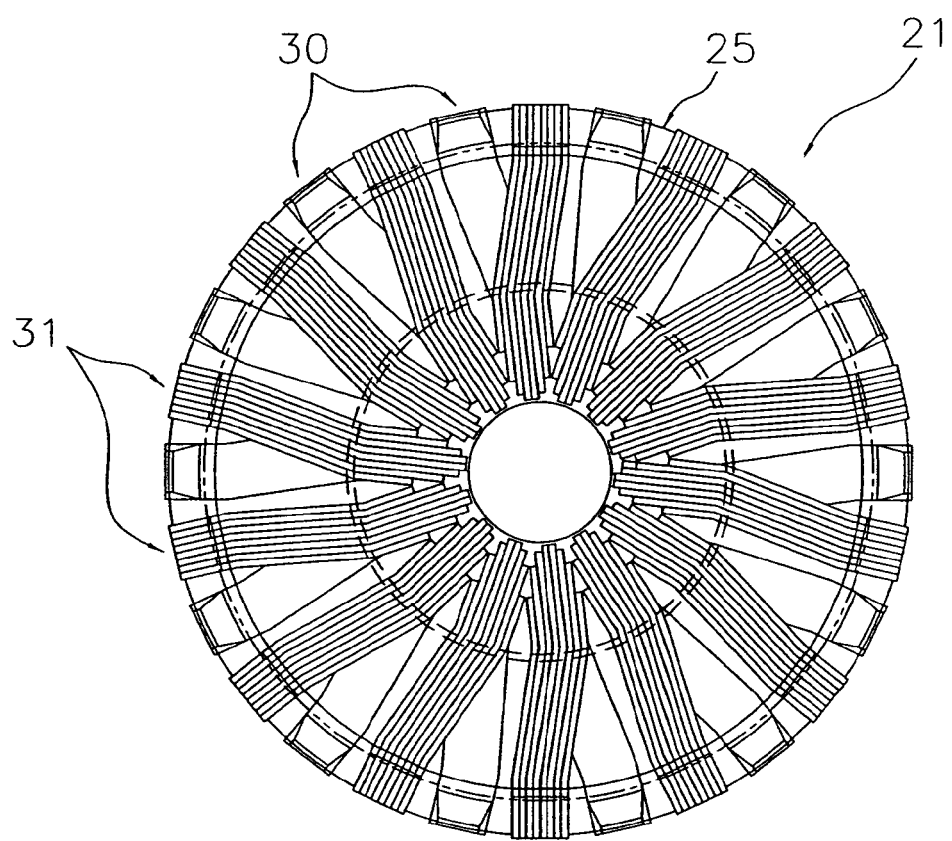
FIG. 6 is a side elevational view of the bobbin/yoke illustrated in FIGS. 2–5 showing all of the layered yokes.
Figure 7:
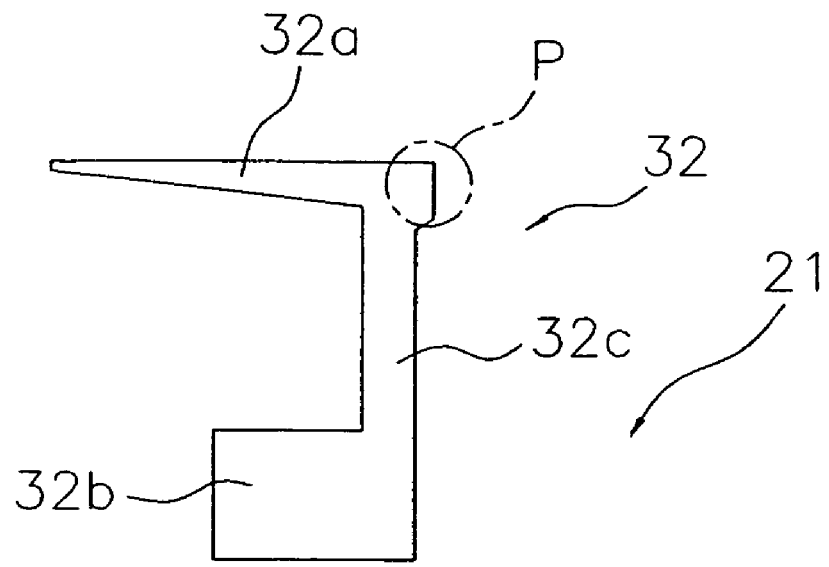
FIG. 7 is a front elevational view of two sets of multiple layer parts of the yoke illustrated in FIGS. 2–6.
Figure 7:
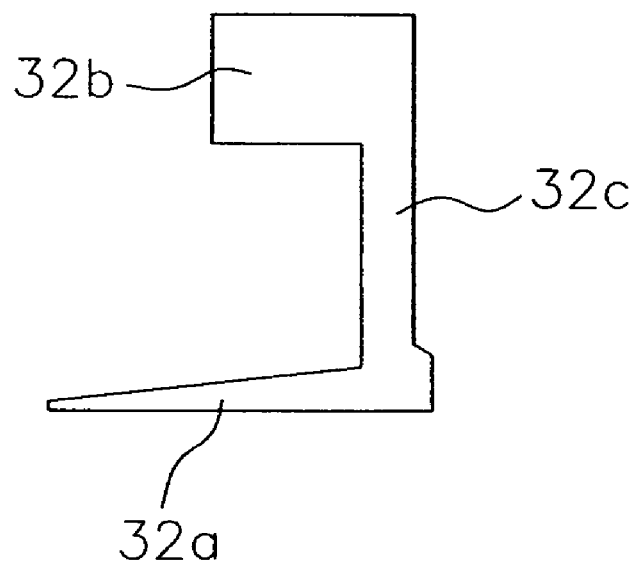
Figure 8:
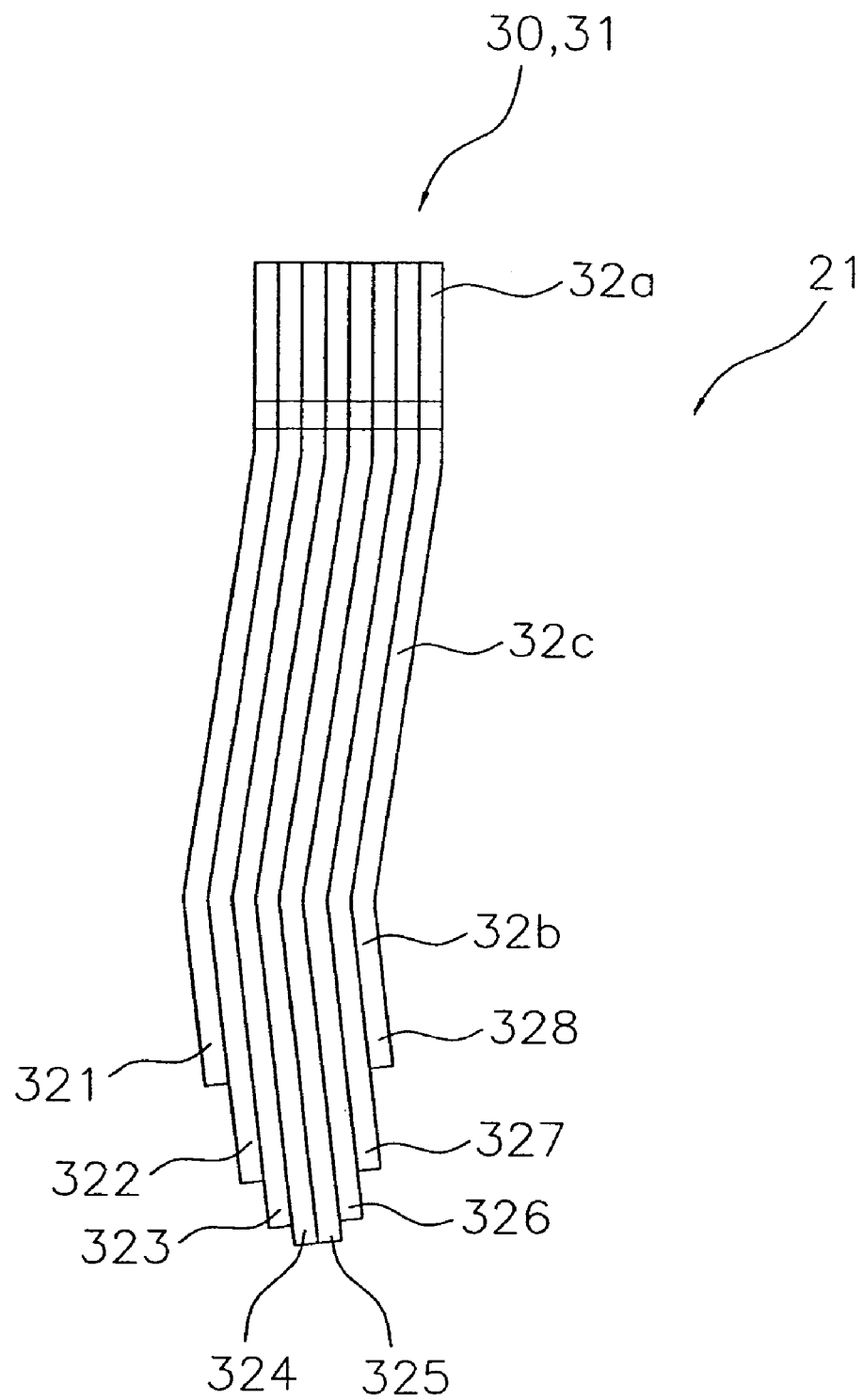
FIG. 8 is an enlarged side elevational view of one set of the multiple layer parts illustrated in FIG. 7.

FIG. 6 illustrates the yoke 21 mounted on the bobbin 25. FIG. 7 and FIG. 8 illustrate only the yoke 21 pulled out or removed from the bobbin 25. This yoke 21, as shown in FIGS. 5 and 6, includes multiple sets of first layered yokes 30 and multiple sets of second layered yokes 31. The multiple sets of first layered yokes 30 are attached so as to fit into the grooves 27a of the first flange 27 of the bobbin 25. Similarly, the multiple sets of second layered yokes 21 are attached so as to fit into the grooves 28a of the second flange 28 of the bobbin 25.

Each of the layered yokes 30 and 31 are structured from the layering of multiple flat layer parts 32, as shown in FIG. 7 and FIG. 8. Each of the layer parts 32 is fabricated from silicon steel (or, more specifically, non-directional silicon steel), with an oxide coating fabricated on the surface thereof. The fundamental shape of each of the layer pieces or flat parts 32 is identical, each having a core outer periphery part 32a, a core inner periphery part 32b, and a linkage or connecting part 32c. The core outer periphery part 32a is arranged so as to extend along the axial direction of the hub axle 5 (the direction of the center line O—O illustrated in FIG. 7) from one end of the linkage part 32. The core inner peripheral part 32b is arranged to extend similarly along the axial direction of the hub axle from the other end of the linkage 32c. These layer pieces 32 are fabricated so that the yoke outer periphery part 32a and the yoke inner periphery part 32b are positioned on different radial lines (i.e. different radial positions), when viewed in the axial direction as shown in FIG. 8.

In addition, with respect to the thickness of each of the layer parts 32, parts with thicknesses of between 0.25 and 1 mm are used, where there are benefits in using parts 0.5 mm thick, both in terms of cost and in terms of functionality. The lengths of the layer parts 32 are different. In other words, each of the layered yokes 30 and 31 is structured by stacking eight of the layer pieces 32, but, as shown in FIG. 8, in each of the layered yokes 30 and 31 the lengths of the inner peripheral sides of the layer parts 321 and 328 furthest towards the outside are the shortest. The layer parts 322 and 327 to the inside thereof are the next shortest, the next layer parts 323 and 326 to the inside thereof are then the next shortest, and the layer parts 324 and 325 closest to the middle are the longest. Setting the lengths in this manner makes it possible to prevent contact between the inner peripheral parts of adjacent layered yokes in the peripheral direction, and to have an efficient structure wherein the magnetic flux circuit has the largest cross-sectional area.

Furthermore, as is clear from FIG. 5, of the layer pieces 32 that comprise each of the layered yokes 30 and 31, the layer pieces 321 and 328, which are positioned furthest to the outside in the peripheral direction, are fabricated such that they are about one-half as long when compared to the other layer pieces, in terms of the length of the core outer periphery parts 32a. This is to prevent contact between the adjacent layer pieces 321 and 328 in the peripheral direction, in order to suppress the leakage of magnetic flux between the two. In addition, each of the layered yokes 30 and 31 protrude slightly towards the outside, in the axial direction of the hub, from the flanges 27 and 28, as best seen in FIG. 5.

Furthermore, as is clear from FIG. 7, for each of the layer pieces 32 the outside (the P part in FIG. 7) of the part that connects the core outer periphery part 32a and the linkage part 32c is not in the shape of an arc, but is rather fabricated with a sharp corner. In this embodiment, the part P is fabricated in the shape of a ninety degree angle or a slightly acute angle on the outer circumference thereof, as seen in FIG. 7. Consequently, with parts constructed in this manner, the distance from the permanent magnet 16 is small (close), increasing the amount of magnetic flux when compared to a yoke fabricated with an arc shape using conventional sheet metal presses.

Note that each of the layer pieces 32, as described above, can be used in either the first layered yoke 30 or the second layered yoke 31.

This type of layer piece 32 is stacked, and fits into the grooves 27a and 28a fabricated in each of the flanges 27 and 28 of the bobbin 25. Furthermore, the distal end part of the yoke outer periphery part 32a of each of the layer parts 32 is fitted into and held by the indentation parts 27c and 28c fabricated in the flanges 27 and 28 on the sides opposite of the bobbin 25 to where the connecting part 32c is mounted.

Given this type of yoke 21, the yoke inner periphery parts 32b of the first and second yokes 30 and 31 are positioned at the inner peripheral side of the coil 20, while the yoke outer periphery parts 32a are positioned between the coil 20 and the permanent magnet 16, shown in FIG. 2. Furthermore, as is clear from FIGS. 2–8, the yoke inner periphery parts 32b of the first layered yokes 30 are directly connected to the yoke inner periphery parts 32b of the second layered yokes 31. Consequently, members comprising other magnetic materials for connecting the first layered yokes 30 and the second layered yokes 31 are unnecessary, making it possible to suppress resistance significantly (extremely).

Figure 9:
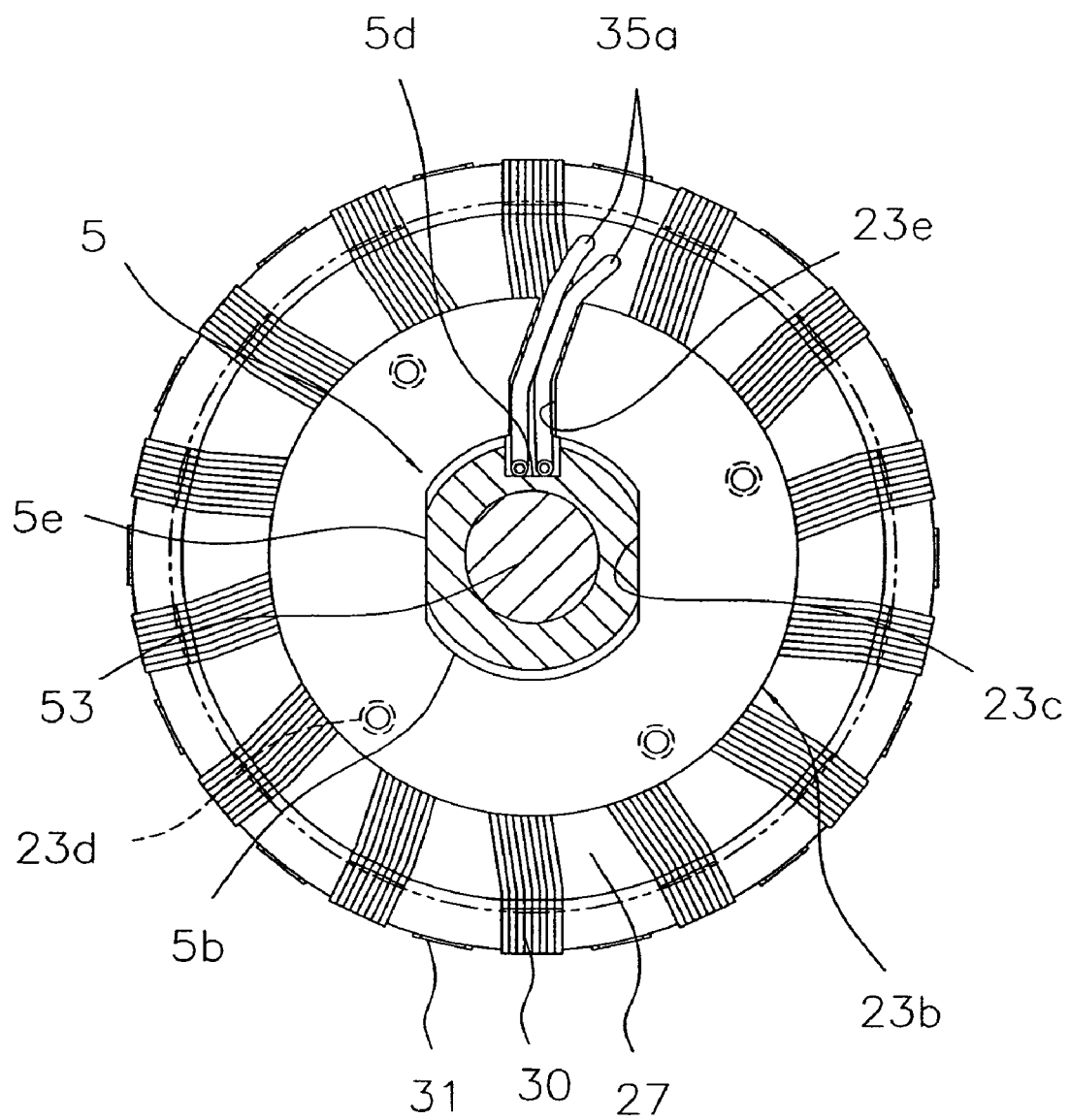
FIG. 9 is a partial cross-sectional and partial end elevational view of the rear hub illustrated in FIGS. 1–8, with portions removed in order to illustrate the structure of the rotation stop of the inside stationary unit.

Note that, as shown in FIG. 2, the washers 23a and 23b are mounted and arranged on the yoke sides of the nuts 22a and 22b for rigidly attaching the coil 20 and the yoke 21. The washer 23b has an essentially oblong stop hole 23c that has flat surfaces that are mutually parallel and that stops the chamfered part 5e of the hub axle 5 to prevent rotation of the washer 23b on the hub axle 5, as shown in FIG. 9. In addition, a protrusion is fabricated on the washer 23b through a press process. The protrusion includes multiple protruding parts 23d that contact the first flange 27 in the areas between the first layered yokes 30 (i.e. that are stopped in the extended part of the first layered yoke 30 and faces the first flange 27). Furthermore, in the washer 23b, a slit 23e, for passing through the connection cord 35a that extends from the coil 20, is formed through a notch towards the outside in the radial direction from a position that is radially opposed (opposite) to the cord wiring groove 5d and extending radially outwardly from the stop hole 23c.

Given the above arrangement, the washer 23b is able to prevent (stop) rotation of the inside stationary unit 17 relative to the hub axle 5, and making it possible to guide with certainty the connection cord 35a, which extends from the coil 20, into the cord groove 5d of the hub axle 5. This connection cord 35a is electrically connected to the charger part 9, as explained below.

Figure 10:
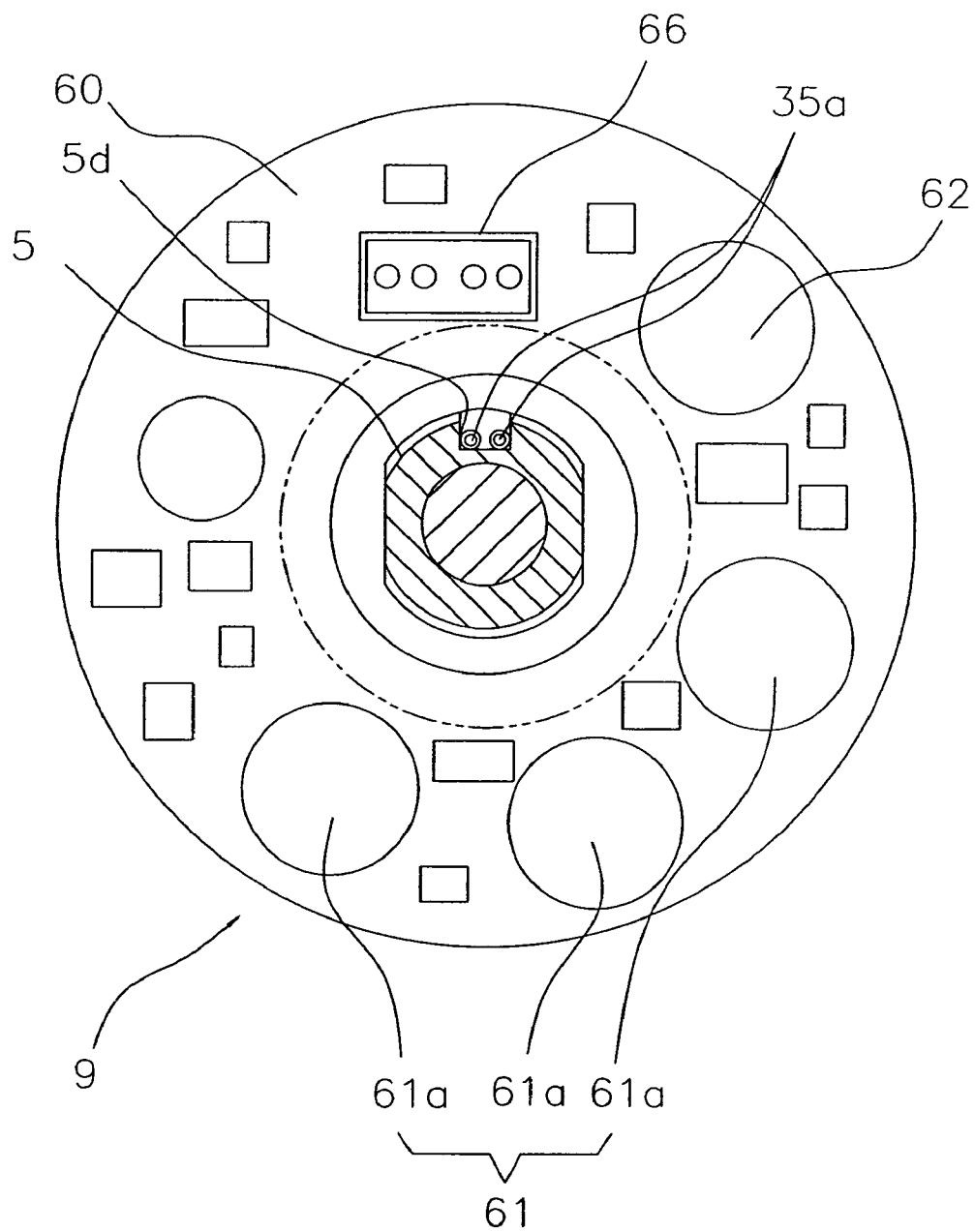
FIG. 10 is a front view of the charger part of the rear hub illustrated in FIGS. 1–9, with portions removed and other portions shown in cross-section for the purpose of illustration.

The charger part 9, as shown in FIG. 2, is rigidly attached to both the electrical generator mechanism 8 and the hub axle 5. Specifically, the charger part 9, as shown in FIG. 2 and FIG. 10, includes a washer-shaped circuit board 60, where the circuit board 60 is non-rotatably attached to the hub axle 5 with an insulated washer 56 between the washer 23b and a nut 22b. In particular, the circuit board has an eccentric opening that mates with the external shape of the hub axle 5 at the flat surfaces 55e. The insulated washer 56 is located axially between the washer 23b and the circuit board 9. The nut 22b retains the parts together.

Figure 11:
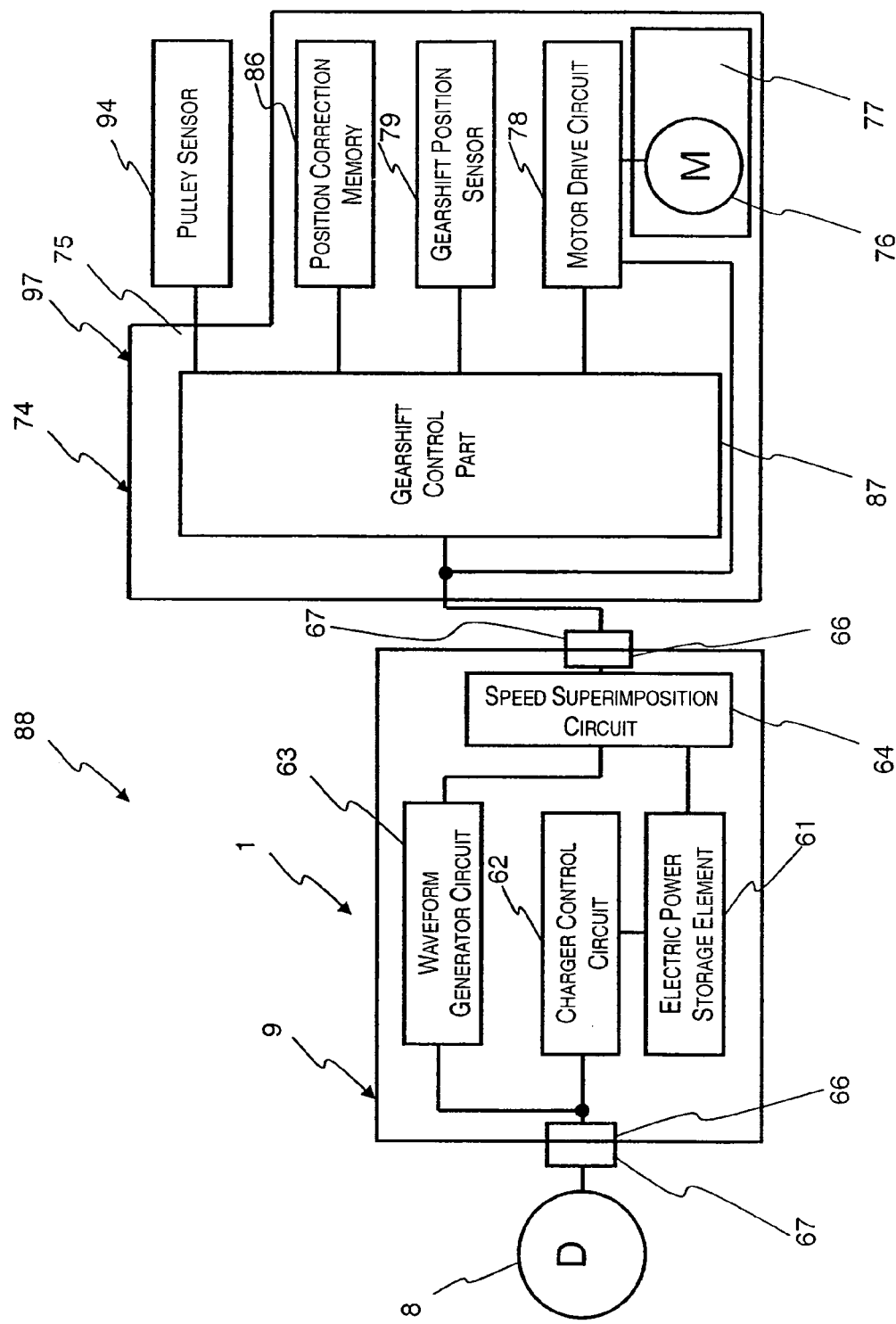
FIG. 11 is a system structure diagram of the gearshift system.

On the circuit board 60, as shown in FIG. 10 and FIG. 11, there are mounted an electrical energy or power storage element 61, including, for example, three electric double layer capacitors 61a, and for example, a charge control circuit 62 that includes a half wave rectifier. Furthermore, on this circuit board 60 there are mounted, for example, a waveform generator circuit that uses zener diodes (an example of a speed signal generator part) 63, and a speed superimposition circuit 64 that is connected to the electric power storage element 61 and the waveform generator circuit 63.

The charge control circuit 62 is a circuit for charging the electric power storage element 61 through rectifying the alternating-current electricity (electric power) generated by the electrical generator mechanism 8 to convert it into direct current. The waveform generator circuit 63 generates a pulse signal according to the electrical generator frequency from the alternating-current electricity (electric power) that is generated by the electrical generator mechanism 8. The pulse width of this pulse signal is short enough to not reset the microcomputer, discussed below. The speed and distance of travel of the bicycle can be determined (detected) using the period of the pulse signal and the radius of the bicycle wheels. The speed superimposition circuit 64 turns off the output from the electric energy (power) storage element 61 with the pulse signal that is outputted from the waveform generator circuit 63, to thereby superimpose the speed signal on the direct-current electric power. By doing this, it is possible to output the speed signal to the outside through the connection cord 35b that outputs the electric power to the outside. A male connector 66 is provided on the circuit board 60 for connecting the connection cord 35a, which is connected to the electrical generator mechanism 8, and for connecting the connection cord 35b, which is connected to the electric power output terminal 11. Female connectors 67, which can be electrically connected and disconnected to and from the male connector 66, are equipped on both of the connection cords 35a and 35b.

The free wheel 10, as shown in FIG. 2, includes a base part 41, a gear attachment part 42 and a one-way clutch 43. The base part 41 is connected non-rotatably to the inner peripheral surface of the cover member 13 of the hub unit 6. The gear attachment part 42 is rotatably mounted on the base part 41. The one-way clutch 43 is disposed between the base part 41 and the gear attachment part 42 such that the gear attachment part 42 freely rotates relative to the base part 41 in one rotational direction, but rotates with the base part 41 in the opposite rotational direction.

As described above, the base part 41 is connected to the inner cylinder part 13b through a cylindrical connecting or linkage bolt 44 that is screwed onto the inner peripheral surface of the inner cylinder part 13b. The linkage bolt 44 mates with the base part 41 at its end (head). Furthermore, the inner cylinder part 13b and the base part 41 are non-rotatably coupled together by the coupling or linkage member 45 that is disposed between the two on the outer peripheral side of the linkage bolt 44. A serration (e.g. splined profile) is formed on the outer peripheral surface of the linkage member 45. The linkage member 45 is pressed into a mating serration (e.g. splined section) formed in the inner cylinder part 13b. The serration of this linkage member 45 also interlocks with a serration (e.g. splined section) formed on one end of the inner periphery surface of the base part 41. With this arrangement, the inner cylinder part 13b and the base part 41 are non-rotatably linked or coupled together reliably and rigidly (i.e. strongly).

The base part 41 is a cylindrical member, with the ball bearing retainer 15a of the axle bearing 7b threadedly coupled thereto. The ball bearing retainer 15a is also used as the ball bearing retainer for one of the bearings for supporting the gear attachment part 42. The other bearing for supporting the gear attachment part 42 is directly supported on the base part 41.

Furthermore, a latch member 43a forming part of the structure of the one-way clutch 43 is mounted on the base part 41 to protrude therefrom. The one-way clutch 43 not only transmits to the base part 41 only the rotation in the forward direction of travel of the multi-stage gear unit 54 (or in other words, the forward rotation of the pedals PD) that is attached to the gear attachment part 43, but is also a clutch for preventing the transmission to the multi-stage gear unit 54 the rotation in the direction of forward travel of the electrical power generating rear wheel 107. The latch member 43a is biased in the direction in which it protrudes (e.g. outwardly in this embodiment) by a spring member 43b. The latch member 43a interlocks with the ratchet teeth 43c that are formed on the inner peripheral surface of the gear attachment part 42 when the gear attachment part 42 is rotating in the direction of forward travel, thereby transmitting the rotation from the gear attachment part 42 to the base part 41. The gear attachment part 42 is a substantially cylindrical member, and the multi-stage gear unit 54 is removably and non-rotatably attached to the outer periphery thereof via splines and mating recesses or the like.

The power output terminal 11 is attached non-rotatably to the hub axle 5 as mentioned above. In this example embodiment, the power output terminal 11 is used in order to use the connection cord 35b, which is wired through the cord wiring groove 5d, for use electrically at the rear derailleur 97. The direct-current electricity (i.e. electric energy or power) upon which the speed signal has been superimposed is outputted from the electric power output terminal 11.

The operation of the rear hub 1 will be explained next.

When the pedal PD of the bicycle is pedaled in the forward rotational direction by the rider (pumped), the rotation of the gear crank 96 is transmitted to the multi-stage gear unit 54 through the chain 95 to rotate the gear attachment part 42. This rotation is transmitted to the base part 41 through the one-way clutch 43, so the hub unit 6 rotates, and thus the rear wheel 107 rotates in the direction of forward travel to generate electricity from the rotation of the hub unit 6 relative to the hub axle. If the pedaling (pumping) of the pedals is stopped during forward travel, the one-way clutch 43 does not transmit the rotation to the gear attachment part 42 even if the rear wheel 107 rotates, so the gear crank 96 does not rotate. However, the hub unit 6 still rotates relative to the hub axle 5 to generate electricity.

Specifically, when the rear wheel 107, or more specifically the hub unit 6 rotates relative to the hub axle 5, the permanent magnet 16 rotates relative to the inside stationary unit 17, which is rigidly attached to the hub axle 5. Because of this arrangement, the permanent magnet 16 rotates relative to the coil 20 and the yoke outer periphery parts 32a of the yoke 21.

When either the yoke outer periphery parts 32a of one of the first layered yokes 30 or the yoke outer periphery parts 32a of one of the second layered yokes 31 receives the N pole magnetic flux from the permanent magnet 16, the other receives the S pole magnetic flux, and when one receives the S pole magnetic flux from the permanent magnet 16, the other receives the N pole magnetic flux, etc. as the wheel 107 rotates. In other words, by rotating the permanent magnet 16 relative to the outer peripheral sides of the yoke outer periphery parts 32a of the first and second layered yokes 30 and 31, a first state where one of the first layered yokes 30 (actually a pair of opposed first layer yokes 30) is the N pole and one of the second layered yokes 31 (actually a pair of opposed second layer yokes 31) is the S pole, and a second state where the first layered yoke 30 is the S pole and the second layered yoke 31 is the N pole, are cyclically repeated, producing an alternating magnetic flux in the yoke inner periphery part 32b of both of the layered yokes 30 and 31, where the layered yokes 30 and 31 are magnetically linked. The alternating flux that is generated on the inside of the coil 20 generates an electric current in the coil 20, thus generating alternating current electricity.

In the rear hub according to this example embodiment, the yoke 21 is structured from stacking the flat layer pieces 32 shaped as discussed above, and thus, when compared to the case of structuring using conventional sheet metal press fabrication to create arc-shaped yokes, it is possible to limit the occurrence of eddy currents.

Furthermore, if conventional claw-pole yoke parts were to be simply replaced by a layered structure (i.e. having conventional yoke shapes without attaching the layered yokes to each other at their inner periphery), it would still be necessary to have other magnetic materials in order to connect the opposing yokes to each other, which would cause an increase in the magnetic resistance, causing efficiency to drop. However, in the present example embodiment there have been innovations in the shape of the yokes to make it possible to connect directly the inner periphery side parts of the mutually-opposing first and second layered yokes, thereby making other magnetic materials for connecting the first and second layered yokes unnecessary, making it possible to maintain a sufficient cross-sectional area for carrying the magnetic flux. Consequently, it is possible to reduce the magnetic resistance significantly (extremely), making it possible to improve efficiency. In other words, in the claw-pole structure in the present example embodiment, not only providing a layered structure for the yokes improves performance, but also the shape of the layered yokes improves performance.

The alternating current electricity (electric energy or power) that is generated by the electrical generator mechanism or part 8 is outputted to the charger part 9, where the alternating current electricity (electric energy or power) is rectified by the charger control circuit 62 of the charger part 9. The alternating current electricity (electric energy or power) is thus transformed into direct-current electricity (electric energy or power), which is stored in the electric power storage element 61 as direct current electric energy or power. Furthermore, a period pulse signal is generated according to the speed of the bicycle in the waveform generator circuit 63, where the direct-current electric power from the electric power storage element 61 is turned on and off by this pulse signal, and the direct-current electric power onto which the speed signal has been superimposed is outputted from the electric power output terminal 11 after passing through the connection cord 35a. Here the rear hub is equipped on the rear wheel 107, and so the distance for supplying the electric power to the electric equipment, which aside from the headlight are near to the electrical generator wheel 107, is short, making it possible to supply the electric power with excellent efficiency. Because the number of cables wired from the rear hub 1 of the rear wheel 107 is small, it is easy to perform the wiring for the electric equipment by wiring from the rear hub 1 of the rear wheel 107 to the electric equipment. Additionally, because the charger 9 is equipped in or on the rear hub 1 and the electric power that is stored therein is outputted, it is possible to output electric power to the electric equipment, such as the electrically powered rear derailleur 97, even when the bicycle 101 is stopped. Because of this, the generated electric power is stable and can be used regardless of the state of motion of the bicycle 101.

Structure of the Electrically Powered Derailleur

Figure 12:
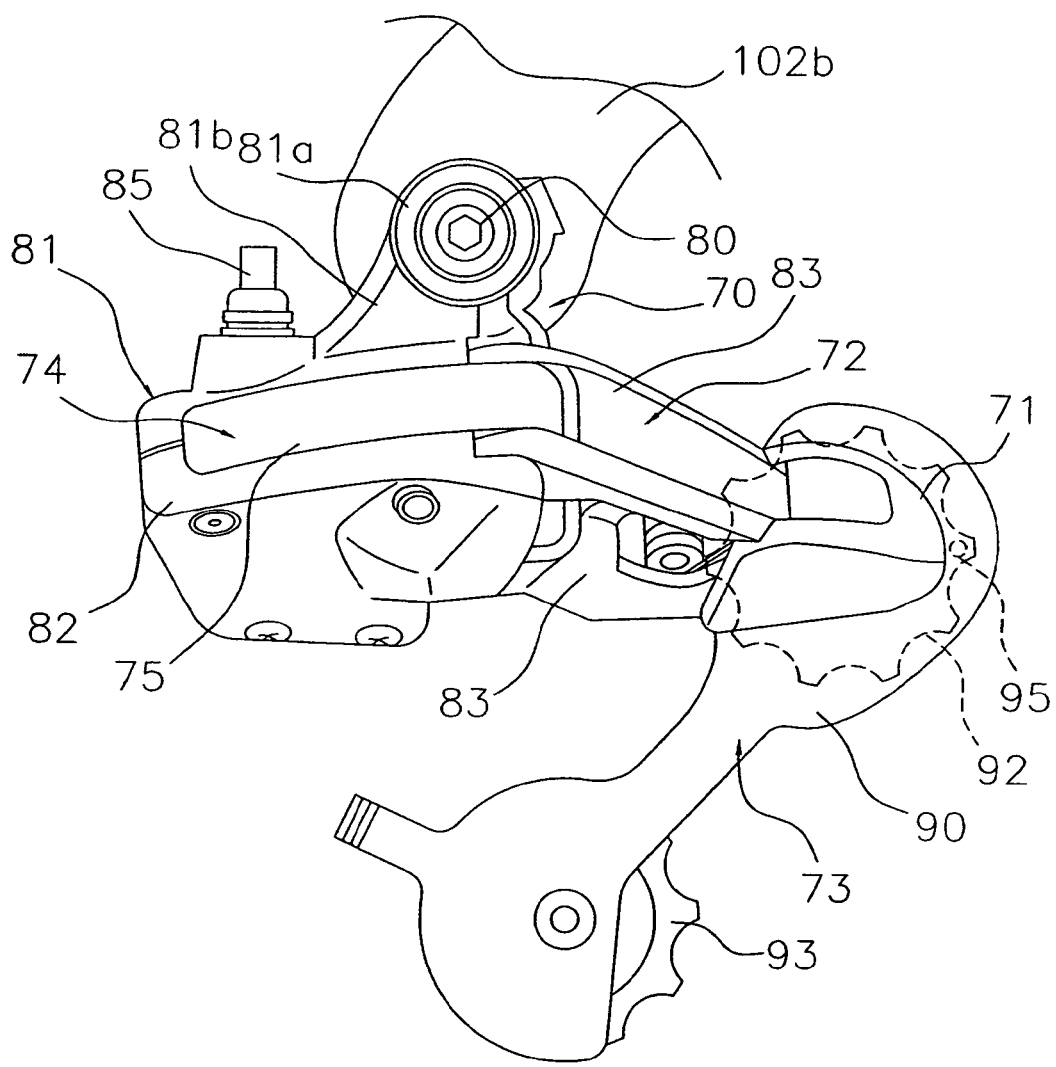
FIG. 12 is a side elevational view of the electrically powered rear derailleur.
Figure 13:
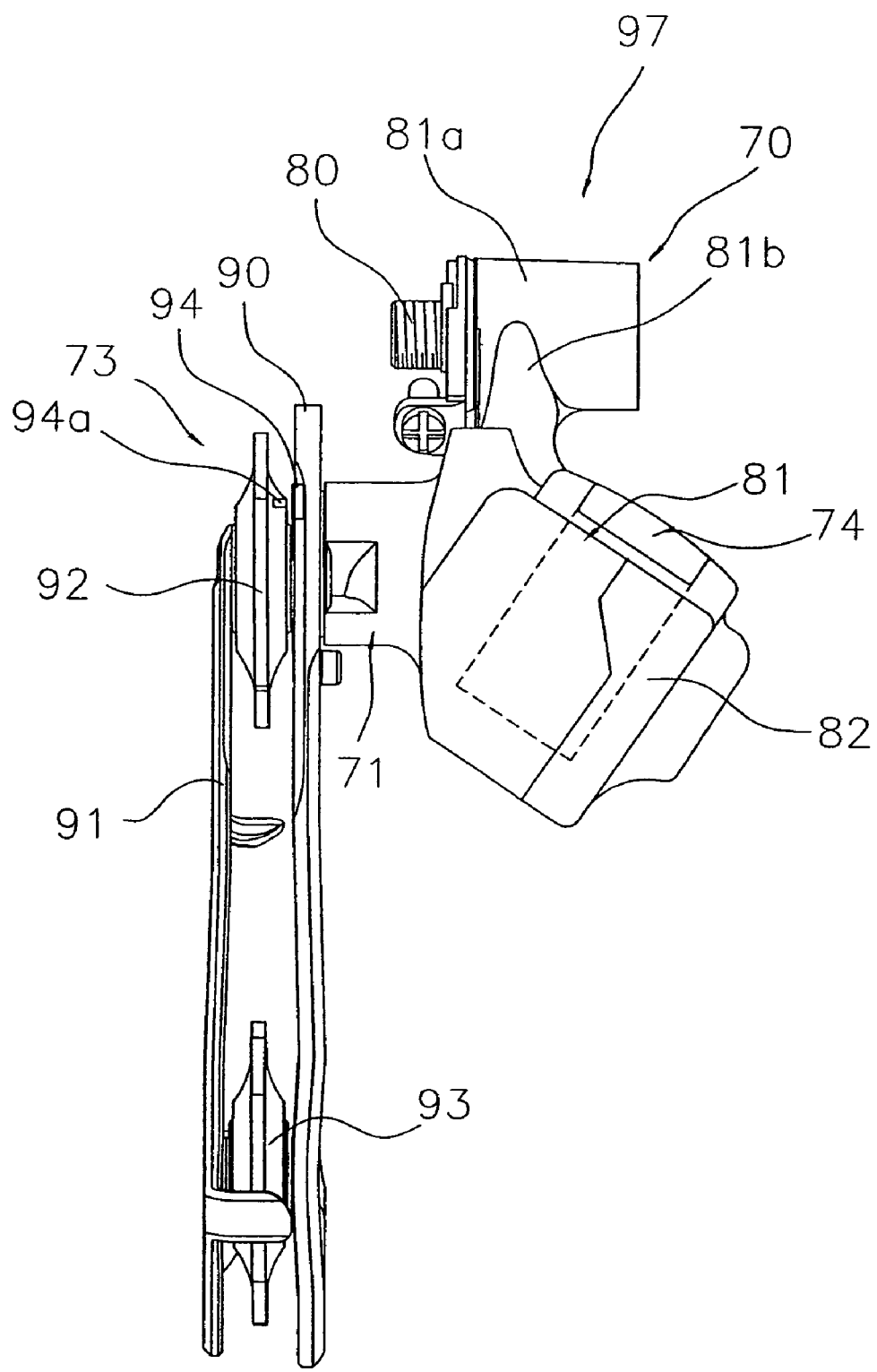
FIG. 13 is an end elevational view of the electrically powered rear derailleur illustrated in FIG. 12.

The electrically powered rear derailleur 97 is the component which changes rear gears by guiding the chain 95 selectively onto the various rear sprockets in the multi-stage gear unit 54. The multi-stage gear unit 54 has multiple sprockets, and is mounted onto the rear hub 1, as discussed above. The electrically powered rear derailleur 97, as shown in FIGS. 12 and 13, includes a base member 70, a moveable member 71, a link mechanism 72, a chain guide 73, and a drive unit 74. The base member 70 is mounted on the derailleur attachment part 102b (FIG. 1), which is equipped on the rear end of the chain stays 102a. The moveable member 71 is moveably coupled relative to the base member 70. The link mechanism 72 moveably links or connects the base member 70 to the moveable member 71. The chain guide 73 that is pivotally (swivelably) mounted on the moveable member 71. The drive unit 74 controls the movement of the link mechanism 72.

The base member 70 is rigidly attached to the derailleur attachment part 102b by a bolt 80 with a hexagon socket formed in the head thereof. The base member 70 includes a primary frame 81 and a secondary frame 82 that is bolted to the primary frame 81 to form a housing. The primary frame 81 is mounted on the derailleur attachment part 102b. The primary frame 81 has an arm part 81b and a boss part 81a. The boss part 81a is mounted on the derailleur attachment part 102b, while the arm part 81b extends from the boss part 81a to the secondary frame 82. The drive unit 74 is disposed between the primary frame 81 and the secondary frame 82 (i.e. within the housing). A wiring connection part 85 for connection, by (electrical) wire(s) to the electric power output terminal 11 of the rear hub 1. The wiring connection part 85 is arranged on the primary frame 81. By connecting this wiring connection part 85 and the electric power output terminal 11 with wiring, the electric power and the speed signal are sent to (provided for) the electrically powered rear derailleur 97, causing and/or allowing the electrically powered rear derailleur 97 to operate.

The moveable member 71 is connected to the link mechanism 72 so that when the link mechanism 72 is driven by the drive unit 74, the moveable member 71 is shifted in a direction towards or away from the chain stays 102a (shifted laterally inward or outward over the gear unit 54). The chain guide 73 is mounted on the moveable member 71 in such a way that it can swivel, and is in a state where it is biased (pushed) in the direction that will increase the tension on the chain 95 (i.e. the clockwise direction in FIG. 12).

The link mechanism 72 is (pivotally coupled) linked on one end to the drive unit 74 and pivotally coupled on the other end to the moveable member 71. The link mechanism 72 includes two links 83 that are (pivotally coupled) linked to the drive unit 74 and the moveable member 71. The links 83 are disposed parallel to each other. One of the links 83 is operatively coupled to the drive unit 74 to be moved. When the links 83, which are operatively linked to the drive unit 74, are rotated, the moveable member 71 shifts towards or away from the chain stays 102a.

The chain guide 73 includes a first plate member 90, a second plate member 91, a guide pulley 92 and a tension pulley 93. The first plate member 90 is swivelably mounted on the moveable member 71. The second plate member 91 is laterally spaced from the first plate member 90, with a gap therebetween. The guide pulley 92 is rotatably mounted on the attachment (base) ends of the first and second plate members 90 and 91 between the plate members 90 and 91, while the tension pulley 93 that is rotatably mounted at the free (other) ends of the first and second plate members 90 and 91 between the plate members 90 and 91. Both plate members 90 and 91 are held stationary relative to each other by the bolts that attach the pulleys 92 and 93. A pulley sensor 94 is mounted at a position that is opposite from the guide pulley 92 on the first plate member 90. The pulley sensor 94 includes, for example, a reed switch. Additionally, a magnet 94a is embedded in the guide pulley 92 in a position that is opposed to the pulley sensor 94 as the detector element for the pulley sensor 94. The pulley sensor 94 detects whether or not the guide pulley 92 is rotated by detecting the magnet 94a when it passes by the pulley sensor 94. The rotation of this guide pulley 92 can detect the rotation of the gear crank 96 because this movement (this operation) is linked with the movement of the chain 95. Because there can be problems in the derailleur 97 if gear changes are attempted (gears were shifted) when the gear crank 96 is not rotating, a decision is made, based on the output of the pulley sensor 94, as to whether or not the state is one wherein the gearshift control can be performed (i.e. whether or not the chain 95 is moving by detecting whether or not the guide pulley 92 is rotating).

The drive unit 74 basically includes a case member 75, a motor unit 77 with a motor 76, a motor drive circuit 78, a gearshift position sensor 79 and a position correction memory 86. The case member 75 is interposed between the primary frame 81 and the secondary frame 82, and houses the various components described below. The motor unit 77 drives the link mechanism 72 using the motor 76. Thus, the motor 76 is operatively coupled to the link mechanism 72. The motor drive circuit 78 drives the motor 76. The gearshift position sensor 79 is arranged to detect the gearshift position of the chain guide 73, which is controlled (driven) by the motor unit 77. Furthermore, the drive unit 74 includes a gearshift control part 87 that controls the motor 76 through the motor drive circuit 78 based on the outputs of the pulley sensor 94, the speed signal obtained from the rear hub 1, and the gearshift position sensor 79.

The motor unit 77 is linked (operatively coupled) to the link 83 of the link mechanism 72. The motor unit 77 reduces the speed of rotation of the motor 76, to swivel the link 83. The gearshift position sensor 79 detects the rotational position of the motor unit 77 for which the speed has been reduced. Because of this, the rotational position detected on the gearshift position sensor 79 will no longer have a linear relationship with the gearshift position of the chain guide 73. It is because of this that the position correction memory 86 is necessary. The position correction memory 86 stores, in the form of a table, for example, the relationship between the gearshift position of the chain guide 73 and the position of rotation that is detected by the gearshift position sensor 79.

The gearshift control part 87 is structured from a microcomputer that includes, for example, a central processing unit (CPU), an I/O interface, random access memory (RAM), and read only memory (ROM), and as described above, automatically performs the gearshift control of the electrically powered rear derailleur 97 based on, primarily the speed signal. A gearshift system 88 is structured from this electrically powered rear derailleur 97, the rear hub 1, the charger part 9, and the gearshift control part 87.

In this type of gearshift system 88, not only are the electrical generator mechanism 8 and the charger part 9 equipped in or on the rear hub 1, but also the gearshift control part 87 is equipped on the electrically powered rear derailleur 97. Thus, it is possible to operate the gearshift system 88 by merely mounting the rear hub 1 and the electrically powered rear derailleur 97 on the bicycle 101 and connecting these components with (electrical) wiring. Moreover, the gearshift system 88 operates without the need for changing the power supply or for mounting on the bicycle 101 any extraneous components aside from the rear hub 1 and the electrically operated rear derailleur. Thus, it is not only possible to reduce the amount of work in the bicycle assembly process and reduce the amount of work in the wiring process, but also possible to reduce the change in the visual appearance of the bicycle 101. Because of this, even when this gearshift system 88 is mounted on the bicycle 101, it is still not only possible to limit the manufacturing costs of the bicycle 101, but also there is little damage to the visual appeal of the bicycle 101.

Figure 14:
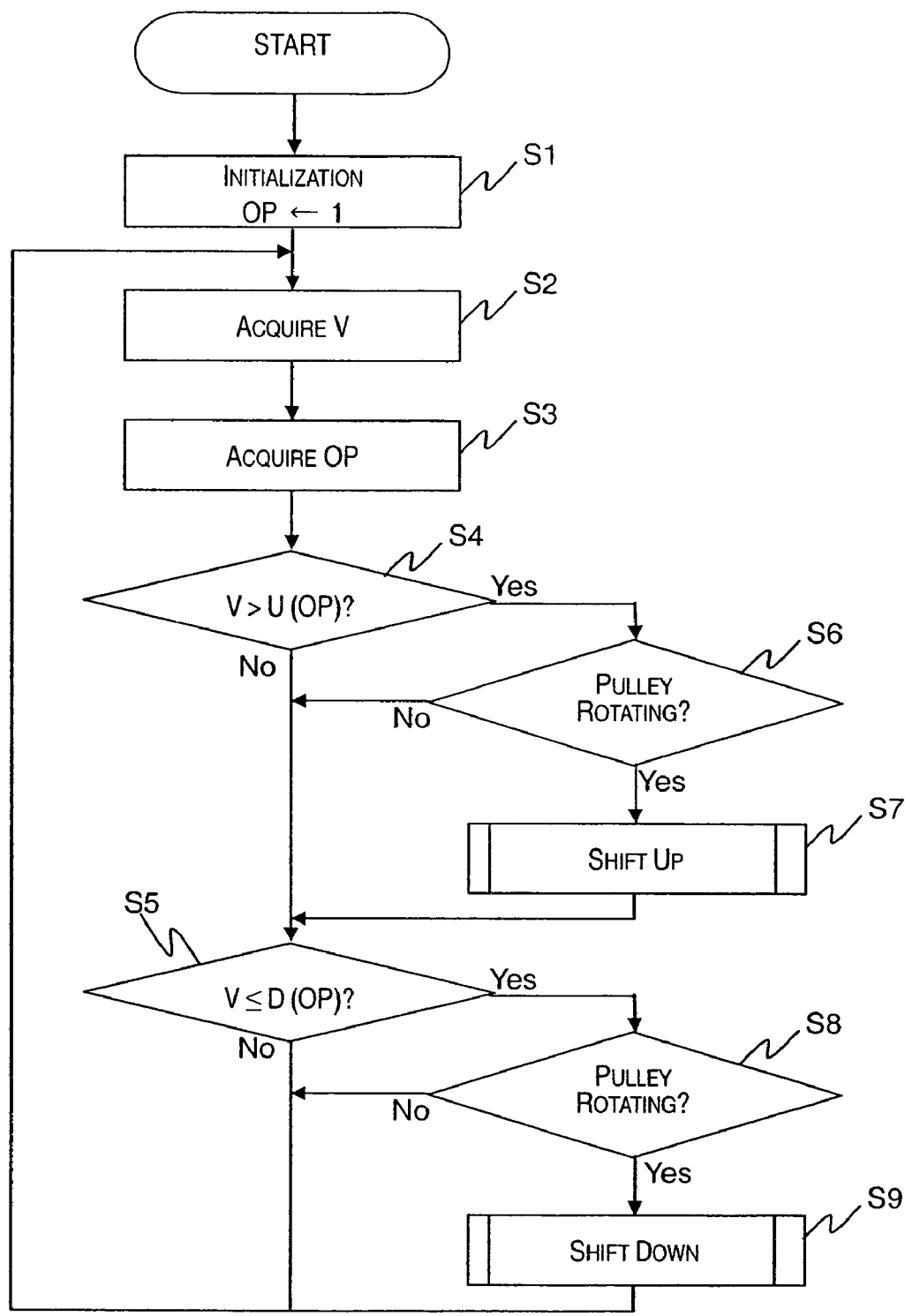
FIG. 14 is a flowchart showing the details of the processing of the main routines for the gearshift control operations.

Next, the gearshift control operations of the gearshift control part 87 will be explained based on the control flowcharts shown in FIGS. 14 and 15.

When the rider rides the bicycle 101, and adequate electrical power has been stored in the electric power storage element 61 by the power that is generated by the electrical generator mechanism 8, the gearshift control of the bicycle 101 is then possible. Given this situation, the gearshift control part 87 is initialized in Step S1 of FIG. 14. In this initialization, the variable OP is initialized to "1." OP is the value for the gearshift stage, and a shift-up threshold value U (OP) and a shift down threshold value D (OP) for each of the gearshift stages OP are stored as bicycle speed values.

In Step S2, the bicycle speed V, calculated based on the speed signal from the rear hub 1, is obtained. In Step S3 the gearshift stage OP that has been set is obtained. This is obtained through reading the data from the position correction memory 86 based on the output of the gearshift position sensor 79. In Step S4 a decision is made as to whether or not the bicycle speed S that has been obtained is in excess of the shift-up threshold value U (OP) for each of the gearshift stages. In Step S5 a decision is made as to whether or not the bicycle speed V that has been obtained is below the shift-down threshold value V (OP) for each of the gearshift stages. When it is determined that the bicycle speed V that has been obtained exceeds the shift-up threshold value U (OP) for each of the gearshift stages, the program advances from Step S4 to Step S6, and a decision is made, based on the output from the pulley sensor 94, as to whether or not the gear crank 96 is rotating, or in other words, as to whether or not the rider is pumping the pedals PD. If it is decided that the gear crank 96 is rotating, then the program advances to Step S7. In Step S7, the shift up process shown in FIG. 15 is performed. If it is decided that the gear crank 96 is not rotating, then the shift-up process is not performed, and the program returns to Step S5.

Figure 16:
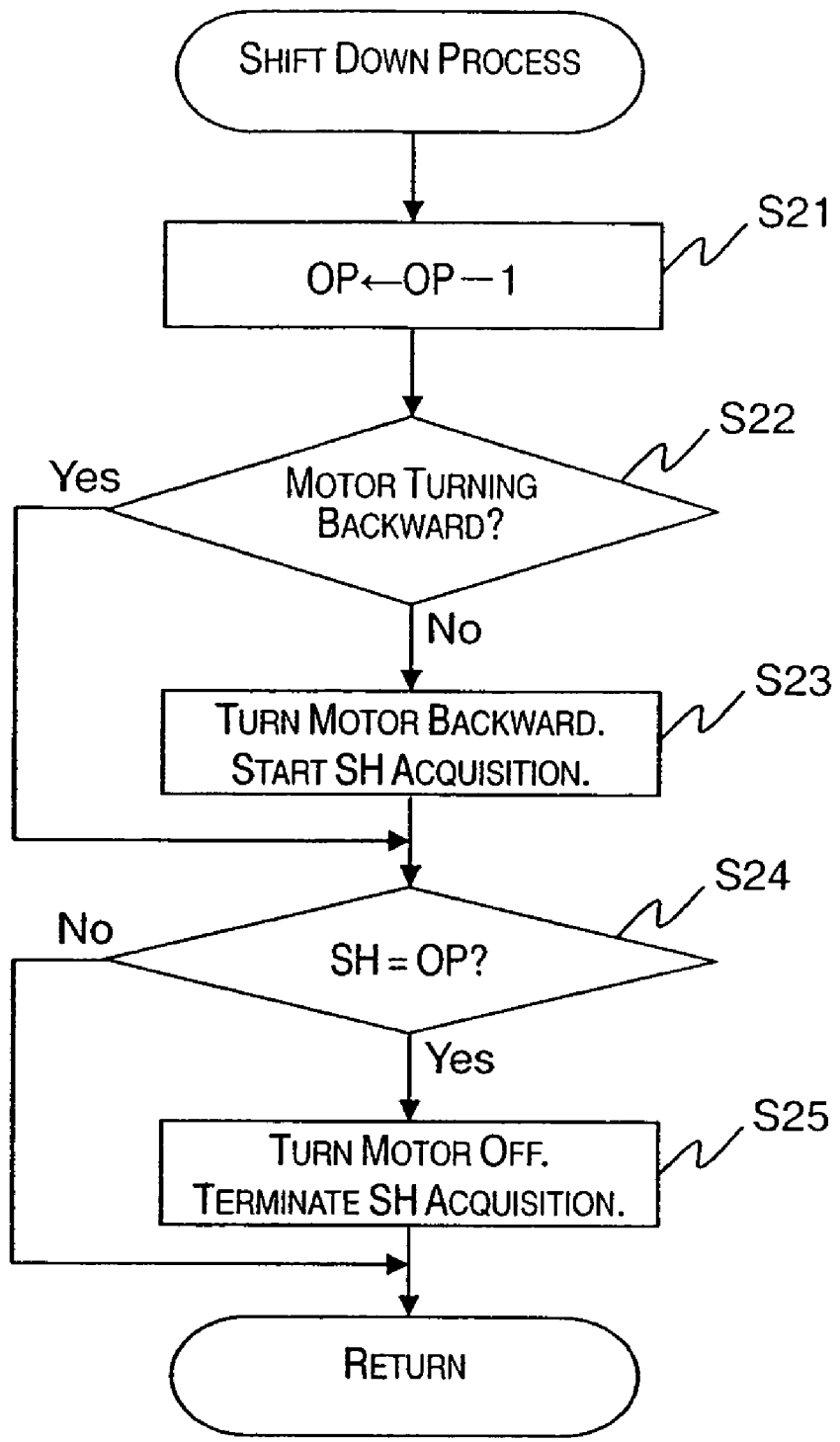
FIG. 16 is a flowchart showing the details of the shift-down process.

If it is decided that the bicycle speed V that is obtained is less than the shift-down threshold value D (OP) for each of the gear speed stages, the program jumps from Step S5 to Step S8, and in the same manner as in Step S6, a decision is made, based on the output of the pulley sensor 94, as to whether or not the gear crank 96 is rotating. If it is decided that the gear crank 96 is rotating, then the program jumps to Step S9. In Step S9, the shift-down process shown in FIG. 16 is executed. If it is decided that the gear crank 96 is not rotating, the shift-down process is not executed, and the program returns to Step S2.

Figure 15:
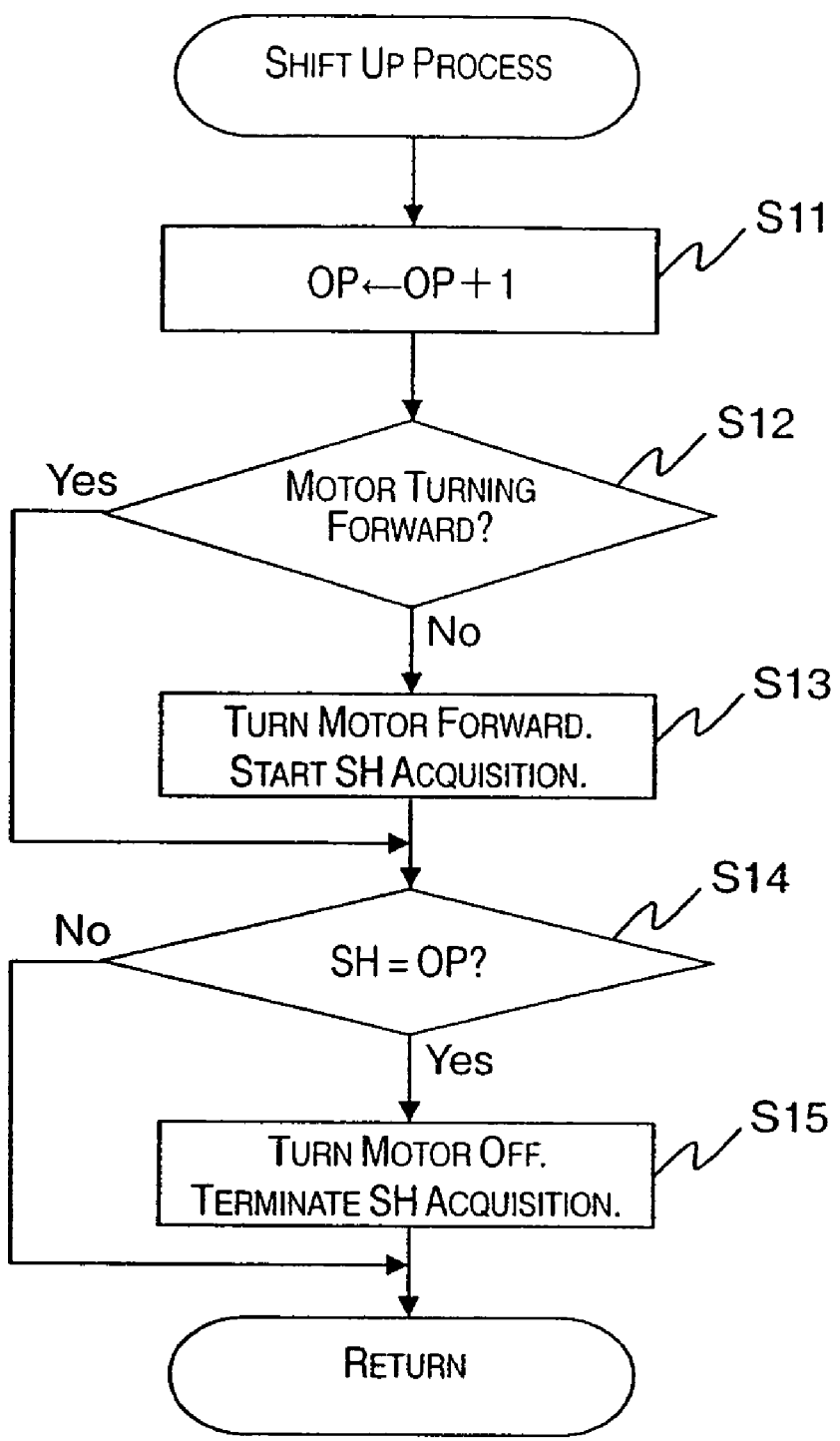
FIG. 15 is a flowchart showing the details of the shift-up process.

In the shift-up process in Step S7, the current gearshift stage OP is incremented by one stage to set the target gearshift stage in Step S11 of FIG. 15. In Step S12, a decision is made as to whether or not the motor 76 is currently turning in the forward direction. By doing so, a decision is made as to whether or not the electrically powered rear derailleur 97 is in the middle of a gearshift operation in the shift-up direction. If the motor 76 is not turning in the forward direction, or in other words, if a shift-up gearshift operation is not in progress, then the program jumps to Step S13, and not only is the motor 76 caused to operate in the forward direction, but also the acquisition of the position data SH of the gearshift position sensor 79 is started. If the motor 97 is already operating in the forward direction, then this process is skipped.

In Step S14, a decision is made as to whether or not the position data SH has achieved the target gearshift stage that has been set, or in other words, a decision is made as to whether or not the gearshift operation should be terminated. If it is decided that the gearshift operations should be terminated, then the program jumps to Step S15, and not only is the gearshift motor turned off, but also the acquisition of position data from the gearshift position sensor is terminated.

If, at this point, a gearshift operation is in progress, first the target gearshift stage is set anew in Step S11, and the target gearshift stage that has already been set is overwritten.

In the shift-down process of Step S9, the current gearshift stage OP is incremented by one stage to set the target gearshift stage in Step S21 of FIG. 16. In Step S22, a decision is made as to whether or not the motor 76 is currently rotating in the backwards direction. Based on this, a decision is made as to whether or not the electrically powered rear derailleur 96 is currently undergoing a gearshift operation in the shift-down direction. If the motor 76 is not rotating in the backwards direction, or in other words, if a shift-down gearshift operation is not in progress, then the program jumps to Step S23, and not only is the motor 76 rotated in the backwards direction, but the acquisition of the position data SH of the gearshift position sensor 79 commences. If the motor 76 is already rotating in the backwards direction, then this process is skipped.

In Step S24, a decision is made as to whether or not the position data SH has reached the target gearshift stage that has been set, or, in other words, a decision is made as to whether or not the gearshift operation should be terminated. If the decision was that the gearshift operation should be terminated, then the program jumps to Step S25, and not only is the motor 76 turned off, but also the acquisition of the position data SH from the gearshift position sensor 79 is terminated.

As with the shift-up operation, even if the gearshift operation is in progress, first, in Step S21, the target gearshift stage is set, and then the target gearshift stage that has been set previously is overwritten.

When this type of automatic gearshift control is performed, conventionally, the control of the gearshift mechanism is performed by a derailleur, or the like, by a gearshift control part that is mounted on the bicycle, in the same way, in response to the speed of the bicycle obtained from a bicycle speed sensor through converting the electric power that has been outputted from the rear hub into direct current power through rectification using the charger circuit that is mounted on the bicycle frame.

However, in the present example embodiment, the charger part 9 is equipped inside of the rear hub 1, and converts the alternating current into a direct current within the rear hub 1, and outputs the direct current, making the charger circuit unnecessary. Furthermore, the gearshift control part 87 is mounted on the rear derailleur 97, making the provision of a separate gearshift control part unnecessary. Because of this, for wiring, all that need be done is to prepare the wiring connection part 85 for the electric power output terminal 11 of the rear hub 1 and the electrically powered rear derailleur 97. Furthermore, because the speed signal is superimposed on the electric power and outputted from the rear hub 1, only a 2-strand wire need be provided as the interconnection cable. As a result, the wiring operations at the time of the bicycle assembly are simplified tremendously. In addition, because only the rear hub 1 and the electrically powered rear derailleur 97 need be mounted on the bicycle 101, the parts installation operations are simplified, tremendously reducing the costs of the bicycle assembly.

OTHER EMBODIMENTS (a) Although in the example embodiment described above, an electrically powered rear derailleur was presented as an example of an electrically powered gearshift mechanism, an electrically powered internal gearshift hub that has an electric charging function may be used instead. In other words, an electrical generator mechanism may be mounted in the inside of an internal gearshift hub in the same way as in the example embodiment described above, and the motor unit, motor drive circuit, and gearshift control part may be housed in, for example, a case and mounted on the hub axle. With this type of internal gearshift hub, it is possible to perform automatic gearshift control by merely mounting the hub on the bicycle.

(b) Although in the example embodiment described above, the charger part 9 was equipped inside of the rear hub 1 and the gearshift control part 87 was equipped in or on the electrically powered rear derailleur 97, both of these may be equipped on the rear hub 1, or may be equipped on the rear derailleur. However, when the output of the electrical generator mechanism 8 is used as the power supply for other electric equipment or when the speed signal is used, disposition as described in the example embodiment above is preferred.

(c) Although in the example embodiment described above, the electrical generator mechanism 8 was disposed inside of the rear hub 1, it may be disposed outside of the rear hub. In this case, the charging part, etc., may also be disposed outside of the hub.

(d) Although in the example embodiment described above, only automatic gearshift processes were performed, a gearshift operating part may be equipped on the handlebar so that manual gear shifting can be performed through connecting the handlebar mounted gearshift operating part electrically to the electrically powered rear derailleur 97. In this case, all that need be done is to mount the gearshift operating part and install the wiring between the gearshift operating part and the electrically powered rear derailleur, making it possible to streamline the equipment installation and the wiring operations relative to what they have been in the past.

As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle electrical generator hub configured to be mounted at the center of a wheel of a bicycle, comprising:
    a hub axle;
    a hub unit rotatably disposed on a periphery of the hub axle with a bearing arranged between the hub unit and the hub axle;
    an electrical generator part configured and arranged to generate electricity from rotation of the hub unit relative to the hub axle;
    a charger part configured and arranged to store the electricity that is generated by the electrical generator part as electrical energy;
    an electrical energy output part that is configured and arranged to output the electrical energy that is stored in the charger part; and
    a signal superimposition part configured and arranged to superimpose a speed signal on the electrical energy stored in the charger part with the electrical energy output part being further configured and arranged to output the electrical energy with the speed signal superimposed thereon.

2. The bicycle electrical generator hub according to claim 1, wherein
    the electrical generator part is configured and arranged to generate alternating current electricity from the rotation of the hub unit relative to the hub axle; and
    the charger part includes a current rectifier circuit that converts the alternating current electricity that is generated by the electrical generator part into direct current electricity, and an electric energy storage element that stores the direct current electricity as direct current electrical energy.

3. The bicycle electrical generator hub according to claim 2, wherein
    the charger part is arranged in the hub unit and includes a washer-shaped circuit board configured and arranged to have the hub axle pass therethrough, and the current rectifier circuit and the electric energy storage element are arranged on the washer-shaped circuit board.

4. The bicycle electrical generator hub according to claim 2, wherein
    the electric energy storage element includes an electrical double-layer capacitor.

5. The bicycle electrical generator hub according to claim 2, further comprising
    a speed signal generator part configured and arranged to generate the speed signal by detecting speed of the hub unit relative to the hub axle based on the alternating current electricity generated by the electrical generator part.

6. The bicycle electrical generator hub according to claim 5, wherein
    the signal superimposition part is configured and arranged to superimpose the speed signal generated by the speed signal generator part on the direct current electrical energy stored in the electric energy storage element, with the electrical energy output part being further configured and arranged to output the direct current electrical energy with the speed signal superimposed thereon.

7. The bicycle electrical generator hub according claim 1, wherein
    the electrical generator part includes a permanent magnet arranged on an inner peripheral surface of the hub unit, and an inner stationary unit rigidly attached to the hub axle that is disposed on an inner peripheral side of the permanent magnet.

8. The bicycle electrical generator hub according to claim 7, wherein
    the inner stationary unit includes a ring-shaped coil disposed on the inner peripheral side of the permanent magnet, and a yoke having multiple sets of first layered yokes and multiple sets of second layered yokes, each of the multiple sets of first layered yokes including multiple flat layer pieces mounted on a first axial side of the ring-shaped coil, and each of the multiple sets of second layered yokes includes multiple flat layer pieces mounted on a second axial side of the ring-shaped coil that is opposite from the first axial side, the first and second sets of layered yokes disposed so as to substantially encompass the periphery of the coil,
    each of the multiple flat layer pieces includes a yoke outer periphery part disposed between the permanent magnet and the coil and extending axially to the opposite side of the ring-shaped coil from the axial side where the piece is mounted, and a yoke inner periphery part that is magnetically connected to the yoke outer periphery part and is disposed on the axial side where the piece is mounted, and
    the multiple sets of the first and second layered yokes are alternately disposed about the ring-shaped coil such that the inner periphery parts of each of the yokes face a direction of the axle and the outer periphery parts of each of the yokes face direction of the periphery.

9. The bicycle electrical generator hub according to claim 1, further comprising
    a free wheel operatively coupled to the hub unit to transmit only rotation in a forward direction of movement of a bicycle to the hub unit.

* * * * *